US012681922B2

(12) United States Patent
Starnes et al.

(10) Patent No.: US 12,681,922 B2
(45) Date of Patent: *Jul. 14, 2026

(54) DATA AGGREGATOR GRAPHICAL USER INTERFACE

(71) Applicant: Intercontinental Exchange Holdings, Inc., Atlanta, GA (US)

(72) Inventors: Joshua Bayne Starnes, Spring, TX (US); Andrew Castellani McSween, Chicago, IL (US); Marc Carl Batten, San Jose, CA (US); Jason Michael Jasinek, Elk Grove Village, IL (US); Arun Narula, Westford, MA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/365,882

(22) Filed: Oct. 22, 2025

(65) Prior Publication Data

US 2026/0044493 A1      Feb. 12, 2026

Related U.S. Application Data

(63) Continuation of application No. 19/221,845, filed on May 29, 2025, now Pat. No. 12,475,111, which is a continuation of application No. 19/021,974, filed on Jan. 15, 2025, now Pat. No. 12,353,406, which is a continuation of application No. 18/680,374, filed on May 31, 2024, now Pat. No. 12,242,470, which is a continuation of application No. 18/495,325, filed on Oct. 26, 2023, now Pat. No. 12,038,914, which is a
(Continued)

(51) Int. Cl.
| | | |
|---|---|---|
| *G06F 16/242* | (2019.01) | |
| *G06F 16/2457* | (2019.01) | |
| *G06F 16/248* | (2019.01) | |

(52) U.S. Cl.
CPC .... *G06F 16/2423* (2019.01); *G06F 16/24573* (2019.01); *G06F 16/248* (2019.01)

(58) Field of Classification Search
CPC ........... G06F 16/2423; G06F 16/24573; G06F 16/248
See application file for complete search history.

(56) References Cited

U.S. PATENT DOCUMENTS 10,146,877 B1    12/2018  Zolnieryk et al.
10,768,798 B1     9/2020  Porath et al.
(Continued)

*Primary Examiner* — Jorge A Casanova
(74) *Attorney, Agent, or Firm* — DLA Piper LLP (US)

(57)      ABSTRACT

Systems and methods for generating a data aggregator interactive graphical user interface. An interactive graphical user interface (GUI) includes a selectable symbol region, a query region and a data results region. The selectable symbol region displays predefined symbols. The query region displays user input fields for generating queries. The system receives user input associated with the user input fields of the query region to form a filter set. The data results region is automatically updated responsive to the user input, to display one or more data values from among one or more databases associated with the filter set. The system receives a subscription request to save the filter set as a user-customized query. A custom symbol is created responsive to the subscription request that is associated with the filter set. The selectable symbol region is updated to display the custom symbol together with the predefined symbols.

23 Claims, 26 Drawing Sheets

Related U.S. Application Data continuation of application No. 18/199,121, filed on May 18, 2023, now Pat. No. 11,846,977, which is a continuation of application No. 18/082,339, filed on Dec. 15, 2022, now Pat. No. 11,704,308, which is a continuation of application No. 17/857,508, filed on Jul. 5, 2022, now Pat. No. 11,556,526.

(60) Provisional application No. 63/355,932, filed on Jun. 27, 2022.

(56) References Cited

U.S. PATENT DOCUMENTS

| | | |
|---|---|---|
| 2007/0025351 A1 | 2/2007 | Cohen |
| 2007/0192265 A1 | 8/2007 | Chopin et al. |
| 2008/0288889 A1 | 11/2008 | Hunt et al. |
| 2011/0112952 A1 | 5/2011 | Annunziata et al. |
| 2018/0060808 A1 | 3/2018 | Borgerson et al. |
| 2018/0309807 A1 | 10/2018 | Smith et al. |
| 2021/0192627 A1 | 6/2021 | Mitchell et al. |

DATA AGGREGATOR GRAPHICAL USER INTERFACE

TECHNICAL FIELD

The present disclosure generally relates to aggregating disparate datasets that do not naturally fit into a traditional time series, and in particular to real-time data aggregation systems, interactive graphical user interfaces (GUIs) having a user-customizable data aggregation wizard, and methods for the customizable integration of disparate datasets into a time series format for interaction and the extrapolation of meaningful information about disparate data types, including for commodity, natural resource and market data.

BACKGROUND

Problems exist in the field of data aggregation and more specifically as it relates to data aggregation platforms. In general, a data aggregation platform may manage datasets related to digital data content (e.g., digital goods, digital information, tangible commodities, etc.) and distribute the content to various end-users. Conventional platforms may distribute digital data aggregate content from one or more data sources (e.g., data feeds, data files, user input and the like) that may be distributed across one or more networks, may include different data types, different data formats, different data communication requirements, different network security, different availability time periods and the like. However, in their raw format, certain disparate datasets cannot easily be presented in traditional time-series formats, database structures, and data intelligence workflows.

All of the above variables associated with data aggregation make it technically difficult to manage data distribution and interaction for real-time consumption by users. Yet further, distribution of digital data content in real-time becomes increasingly difficult as the volume of digital data content to be distributed increases and/or as the digital data content changes more rapidly over time (e.g., with increasing volatility of the data content). For example, it may become increasingly technically difficult for a distribution platform to continually update an interactive user interface with the most up-to-date data content, when the data volume increases and/or the data content itself changes rapidly. In such instances, any transmission delays over one or more networks to obtain the data content coupled with any data handling delays by the distribution platform for handling the received data content (e.g., to convert a data format of received data content, to normalize any data content, to remove any data content not suitable for presentation, to generate data for distribution in one or more distribution formats, create aggregated output data, generate any user interfaces and the like) may introduce significant errors in distributed data and the ability by the end-user to interact with the distributed content.

Further still, it is challenging for conventional data aggregation platforms to manage large amounts of disparate data sets where each data type within the dataset has its own unique identifier, history, and attributes. As conventional data aggregation platforms implement traditional workflows that require an identifier to be defined with the associated history, the amount of key-value-pairs (e.g., groups of key identifiers and sets of associated values) within these datasets could constitute effectively infinite identifiers, which is difficult to search, maintain, and support.

Another significant technical problem that exists in one-size-fits-all (i.e., mass use) conventional data aggregation platforms include the rigidity of the workflows and interfaces of these platforms. Since each dataset is a combination of filters, each dataset requires that appropriate filters be selected in order to retrieve the specific dataset and its corresponding history and current data values. As such, for datasets with attributes that do not align with a platform's filters, data presentation associated with the dataset often lack relevant information and/or are incomplete.

Accordingly, there is a need for systems and methods for aggregating, publishing, and presenting disparate data types in a fully-automated (or near fully-automated) manner. There is also a need for systems and methods to provide disparate data in a manner that is customizable by the user, for improved usability. All of this, without significant increases to the computational burden, cost, system complexity, re-programming requirements and system maintenance.

SUMMARY

Aspects of the present disclosure relate to systems, methods and non-transitory computer readable mediums for aggregating disparate data fields of a single dataset into a singular datapoint that can be viewed and subscribed to in a synthetic aggregation wizard by one or more client devices. These novel systems and methods provide improvements over conventional systems by enabling the aggregation of datasets that do not naturally fit into a traditional time series, to be easily mapped, filtered, and displayed via an interactive graphical user interface (GUI) operating on the synthetic aggregation wizard. These systems and methods additionally allow users to submit queries and create aliases for the disparate datasets that can be further added to data intelligence charts, data tables, watchlists, and subscribed to by any user that has access to the synthetic aggregation wizard and is privy to the alias name. Moreover, data aggregation provides the historical time series of the alias/query, the current state, and supports dynamic real-time updates to the aggregation resulting from any changes in the underlying dataset.

In some embodiments, aspects of the present disclosure relate to systems and methods for generating an interactive graphical user interface (GUI) for aggregating data to generate user-customizable aggregated data queries. The system includes one or more databases configured to store data from among one or more data sources and one or more processors and a memory storing computer-readable instructions. The computer-readable instructions, when executed by the one or more processors, cause the system to: generate an interactive GUI comprising a selectable symbol region, a query region and a data results region. The selectable symbol region is configured to display one or more predefined symbols, where each of the one or more predefined symbols have a predefined filter set associated with a predefined query. The query region is configured to display one or more user input fields for generating one or more queries. The system is further configured to receive, via at least one user device, user input associated with at least one field among the one or more user input fields of the query region to form a filter set; responsive to the user input forming the filter set, automatically update the data results region, such that the data results region is configured to display one or more data values from among the one or more databases associated with the filter set; receive, via the query region, from the at least one user device, a subscription request to save the filter set as a user-customized query; responsive to the subscription request, create a custom symbol and associate the custom symbol with the filter set; and update the selectable symbol region to display the custom symbol together with the one or more predefined symbols.

BRIEF DESCRIPTION OF DRAWINGS

FIGS. 10A, 10B, 10C and 10D are screenshots of an example dynamic results region of the interactive GUI of FIG. 8A, according to an aspect of the present disclosure.

FIGS. 12D and 12E are screenshots of example data table windows that may utilize one or more synthetic symbols generated in the interactive GUI of FIG. 12A, according to an aspect of the present disclosure.

DETAILED DESCRIPTION

Figure 1:
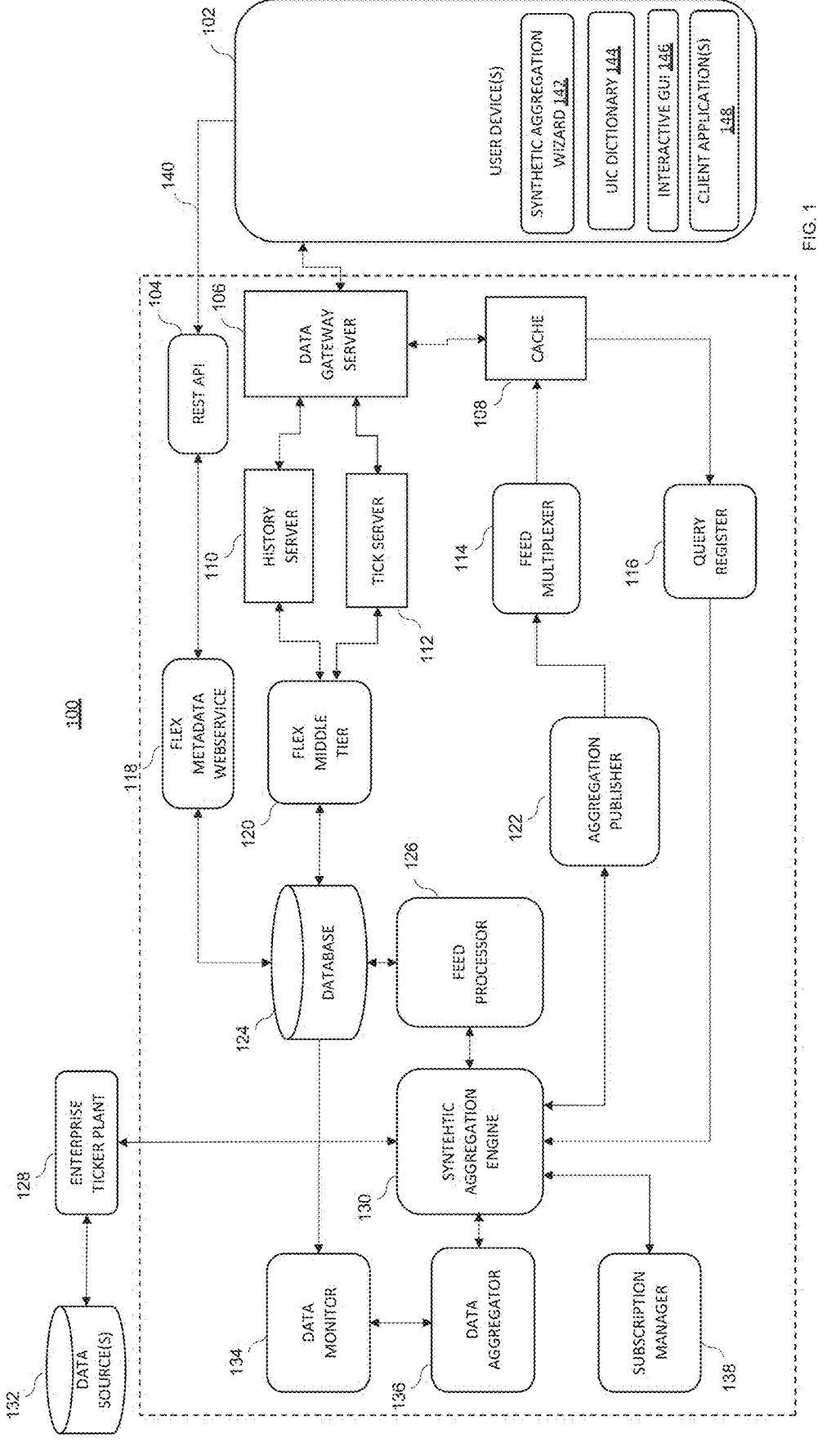
FIG. 1 is a block diagram of an example computing environment, according to an aspect of the present disclosure.

As discussed above, problems exist in the aggregation, publishing, and presentation of disparate data types. One such non-limiting combination of disparate data types relates to natural resource data, commodities data, and market data. Each of these disparate data types may include historical data values, current (e.g., streaming/live) data values and/or future (e.g., predicted or forecasted) data values. Each of these disparate data types also rely on underlying data and information that may be rapidly changing. Yet further, each of these disparate data types involve large volumes of data. For example, market data typically involves tens, if not hundreds, of thousands of live indications available to display at any given time, and where changes to market data may occur hundreds, if not thousands of times in a second. Natural resource data may involve ever-changing currently availability, consumption information, as well as forecasted availability, by geographic location (e.g., country, state, and local, scale). Similarly, commodities data may involve continually changing import and export data from among a large number of locations (e.g., on a global scale, on a country-level scale, on a state-level scale, etc.), as well as production forecast data that may include a number of different models that may be updated at different intervals. All of the above variables make it technically difficult to manage data aggregation, presentation and real-time comparative analysis of disparate datasets. Indeed, because of the myriad of market datasets, it becomes further technically difficult to provide one solution that is capable of integrating these data types in an intelligent and meaningful manner, let alone intelligently integrate these data types in a manner that allows for user-customization of aggregated data.

These non-traditional and disparate datasets may include but are not limited to datasets related to market data, natural resources, and commodities. For example, in one instance, the non-traditional dataset could be oil import and export data. Querying oil import and export as a datapoint will result in a feed of unique data values that cannot be captured or presented by conventional market analysis tools that provide information on exchange traded securities in a time series data format. For example, a query for oil import and export information may result in receiving unique data values, such as oil production values, oil import/export vessel transport information, and port information.

In another example, the non-traditional dataset may include gold (i.e., a natural resource) production and consumption data. As with the oil example, querying gold production and consumption as a datapoint will also result in a feed of that cannot be captured or presented by conventional market analysis tools that provide information on exchange traded securities in a time series data format. For example, in one instance, a query for gold production may result in receiving unique data values, such as gold mining production values, gold import/export transport information and port information.

From a data analysis tool perspective, the ability of a system/tool that is capable of aggregating and making these data values available in a user friendly and meaningful format where the data can be presented and charted over time is highly beneficial. Accordingly, one advantage of the present disclosure are the systems, methods (i.e., software workflows), and synthetic aggregation wizard that are configured to and capable of aggregating these non-traditional datasets, mapping them according to user-defined (user-customizable) and product defined aggregations, and distributing them via an interface wherein the dataset can be manipulated for further insights.

The present disclosure is the first to enable querying of non-traditional datasets that do not naturally fit into a traditional time series, the presentation of the datasets in an intelligent format that both fits the unique attributes of the dataset, is meaningfully displayed, and further enables users to create aliases (i.e., a unique synthetic symbol) for the query of the dataset, so that users can subscribe to the queried dataset, for example, similar to how a user would subscribe to a traditional security traded on an exchange.

In some examples, the present disclosure allows users to interact with these non-traditional datasets via a synthetic aggregation wizard in a manner including but not limited to user defined and product defined aggregations. In some examples, the synthetic aggregation wizard may be configured to provide more efficient access to non-traditional and disparate datasets in an optimal manner, resulting in user interfaces that quickly render any suitable chart, table, analytic value extremely fast using static, periodic, aperiodic and/or streaming data. For example, in one instance, the synthetic aggregation wizard may be configured to retrieve oil import and export data for one or more ports and display the number of barrels that imported and exported over time (i.e., oil import/export time series information) via the synthetic wizard in a customizable and filterable format.

In some examples, aspects of the present disclosure relate to intelligent data aggregation systems and wizards that improve streaming data in an efficient manner into various client applications. Data aggregation systems of the present disclosure are unique in that the functionality of streaming real-time non-traditional datasets (e.g., those related to commodities, etc.) into a synthetic aggregation wizard and mapping and converting data values associated with the non-traditional datasets into a format that can be charted and subscribed to by users, does not exist outside of the present disclosure. The data aggregation system may also provide insights via data feature engineering (i.e., user-customized synthetic symbols) that are not immediately ascertainable by merely aggregating the raw data values alone. It is understood that the ability to handle and process an ever-growing amount of global data for myriad data sets is a technical problem. Thus, the ability to handle and process streaming raw data, intelligently aggregate the streaming data and convert this streaming data into actionable knowledge via a synthetic aggregation system (as performed by the systems and methods of the present disclosure) represent a technical solution to a technical problem.

Although disclosed principles are described with reference to disparate datasets associated with commodities data, market data, and natural resources data, it should be understood that these principles may apply to any types of disparate data, systems that process disparate data, and interactive GUIs that are configured to display disparate data in a time series format. Accordingly, the disclosed principles are not limited to disparate datasets associated with commodities data, market data, and natural resources data.

Referring to FIG. 1 a block diagram of an example computing environment 100, according to one or more embodiments is shown. Computing environment 100 may include one or more user device(s) 102, representational state transfer (REST) application programming interface (API) 104, data gateway server 106, cache 108, history server 110, tick server 112, feed multiplexer 114, query register 116, flex metadata webservice 118, flex middle tier 120, aggregation publisher 122, at least one database 124, feed processor 126, enterprise ticker plant 128, synthetic aggregation engine 130, one or more data sources 132, data monitor 134, data aggregator 136, and subscription manager 138.

In one or more embodiments, user device(s) 102 may be operated by a user (not shown). User device(s) 102 may be representative of (without being limited to) a mobile device, a tablet, a desktop computer, or any computing system having the capabilities described herein. Users may include, but are not limited to, individuals such as, for example, individuals (e.g., analysts, traders, academics, and quants), companies, prospective clients, and or customers of an entity associated with computing environment 100, such as individuals who have a need to access or glean insight from non-traditional datasets.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, user device(s) 102 may include a non-transitory memory, one or more processors including machine readable instructions, a communications interface which may be used to communicate with a server, a user input interface for inputting data and/or information to the user device and/or a user display interface for presenting data and/or information on the user device. In some embodiments, the user input interface and the user display interface are configured as interactive graphical user interface (GUI) 146 operating on synthetic aggregation wizard 142 operated by user device(s) 102. The user device(s) 102 may also be configured to provide any downstream system (e.g., a server) and/or device, via interactive GUI 146, input information (e.g., queries, user-customized filter set, alias names, subscription preferences, and charting parameters) for further processing. In some embodiments, interactive GUI 146 is hosted by computing environment 100 or provided via at least one client application 148 operating on the user device.

REST API 104 may comprise an interface that enables computing devices to access computing environment 100, in order to exchange information securely and will return a list of available pre-defined synthetic symbols (i.e., non-traditional datasets) responsive to an API call. REST API 104 may additionally retrieve field values for each respective pre-defined synthetic symbol or new synthetic symbol responsive to an API call. Notably, there are pre-defined synthetic symbols associated with pre-defined variables, parameters, and filters, created by the system. In addition, there are also (new) synthetic symbols that include variables, parameters, and filters selected by a user operating synthetic aggregation wizard 142, to create user-customized synthetic symbols.

Data gateway server 106 may serve as an entry point into the synthetic aggregation infrastructure. Data gateway server 106 may consolidate simultaneous client requests into a single request to downstream backend infrastructure and may fan out responses to individual user device(s) 102. Data gateway server 106 may additionally provide in-direct access to the data available on cache 108, history server 110, and tick server 112, and may enforce authorization controls in order to access the content.

Cache 108, also referred to as a data manager, may be configured to receive data from feed multiplexer 114 and may store the data in a distributed fashion that is accessible to data gateway server 106. Cache 108 may utilize publishing/subscribing technology to bring the desired data closer to the clients that subscribe to real-time updates of this data. Cache 108 may receive synthetic aggregation requests (e.g., from synthetic aggregation wizard 142) in the form of the query and may forward the query to query register 116, so that aggregation publisher 122 can publish data to feed multiplexer 114. Cache 108 may then receive the aggregated data, which data may be forwarded to data gateway server

106 and further pushed to the user device(s) 102 (that subscribed to the synthetic symbol associated with the aggregated data).

History server 110 may be configured to provide (for example) daily, weekly, monthly (and greater in some examples), aggregate time series data to data gateway server 106. In addition, history server 110 may be configured to provide average weekly records/events, seasonal charts (year over year) with monthly totals, weekly sums for a specific quantity pulled from underlying records, for a given dataset as a time series. When receiving a synthetic symbol (from data gateway server 106), history server 110 may forward the request to flex middle tier 120 for processing.

Tick server 112 may be configured to provide intraday and tick time series data to data gateway server 106. When receiving a synthetic symbol (from data gateway server 106), tick server 112 may forward the request to flex middle tier 120 for processing. In some examples, the tick time series data provided by tick server 112 may include record level data of a dataset. Tick (time series) data may be different from conventional time series data, where each point in time may have a value. For example, the tick (time series) data may include one or more events (e.g., records) at the same point in time. The tick data may also include additional metadata that may not necessarily (in some examples) lend itself to a traditional time series, but may lend itself to filtering purposes. In some examples, tick time series data may be relevant at a record level, but may lose context when the data is moved to a time series. For example, tick time series data may include a bid price that may only be relevant at a particular point in time (i.e., the value of the bid price may change in real-time).

Feed multiplexer 114 may be configured to ingest a multitude of data sources and generate output channels with associated authorization information and content as desired for one or more downstream consuming systems (not shown).

Query register 116 may be configured to communicate with and inform data aggregator 136 that there is a new synthetic aggregation that needs to be calculated (e.g., generated). For example, query register 116 may publish a message to synthetic aggregation engine 130 that signals that that there is a new request for a synthetic symbol. For example, query register 116 may publish a message with a topic called "NewSyntheticRequest". This message may contain the symbol requested, which server requested it, and which user and/or user device(s) 102 that requested it. Query register 116 may also be responsible for communicating to the synthetic aggregation engine 130 it no longer needs to calculate a given aggregation because no users are subscribed to the aggregation.

Flex metadata webservice 118 may be configured to communicate with synthetic aggregation wizard 142 to help display what values are available for a selection within each individual field. Client application 148 (also referred to as Connect) running on user device(s) 102, and which may have a server-side counterpart within computing environment 100, may request that flex metadata webservice 118 pull the unique values of a given field (as defined by user interface controller (UIC) dictionary 144) from database 124 in real-time.

Flex middle tier 120 may be configured to decode a unique identifier representing a synthetic symbol submitted in a query from user device(s) 102. Flex middle tier 120 may be configured to determine which dataset the user is interested in and what filter criteria the user are looking to apply. Flex middle tier 120 may transform the unique identifier into one or more appropriate aggregation queries to database 124 that are grouped together by date, ultimately returning a time series view of data aggregated based on the query received from user device(s) 102. Responses from flex middle tier 120 may go to history server 110 and/or tick server 112, depending on what component made the original request.

Aggregation publisher 122 may be configured to receive the aggregated data from data aggregator 136 and may convert the aggregated data into one or more proprietary feed formats that downstream systems are currently capable of ingesting. The proprietary feed(s) may become new feed(s) into feed multiplexer 114 to be broadcasted via multicast to one or more computing devices accessing computing environment 100.

In general database 124 may include one or more databases. Database(s) 124 may be locally managed and/or may include a cloud-based collection of organized data stored across one or more storage devices. In some examples, database(s) 124 may include a complex configuration and may be developed using one or more design schema and modeling techniques. In one or more embodiments, database(s) 124 may be hosted at one or more data centers (not shown) operated by a cloud computing service provider (not shown). Database(s) 124 may be geographically proximal to or remote from the various other components in computing environment 100. Database(s) 124 may be configured for data dictionary management, data storage management, multi-user access control, data integrity, backup and recovery management, database access language application programming interface (API) management, and the like. Database(s) 124 may be configured for communication with various components in computing environment 100 and user device(s) 102 via one or more networks 140 (e.g., a private network (e.g., a local area network (LAN), a wide area network (WAN), intranet, etc.) and/or a public network (e.g., the Internet)). Database(s) 124 may be configured to store various data, including one or more tables, feed and synthetic symbol related information, user log-in and access information, and the like.

Feed processor 126 may be configured to receive raw data from enterprise ticker plant 128 and store the raw data into database 124. Changes to database 124 are then captured (by database 124) and sent directly to data aggregator 136.

Enterprise ticker plant 128 may be configured to connect to data source(s) 132 and download raw (and updated data) at one or more pre-determined intervals. The raw/updated data may be distributed to downstream components via synthetic aggregation engine 130. In some instances, the raw/updated data may be in a JavaScript Object Notation (JSON) format.

Synthetic aggregation engine 130 may comprise a data management module that is configured to route data to the appropriate component(s). In a non-limiting capacity, synthetic aggregation engine 130 may receive one or more requests for new synthetic symbols and may route the request(s) to data aggregator 136. In another non-limiting example, synthetic aggregation engine 130 may receive a feed of data from enterprise ticker plant 128 and may route the data feed to feed processor 126. Synthetic aggregation engine 130 may additionally receive and route subscription related data to subscription manager 138.

Data source(s) 132 may include one or more databases internal to and/or external from computing environment 100. Data source(s) 132 may store or be in possession of data relevant to synthetic symbols requested by user device(s) 102. Data source(s) 132 may return data to computing environment 100 in response to requests from enterprise ticker plant 128 and/or may push data to enterprise ticker plant 128 (e.g., periodically, in response to one or more events, etc.).

Data monitor 134 may be configured to detect updates in data stored in database 124 and communicate changes to the data with data aggregator 136. Data monitor 134 may continuously monitor for any changes and/or updates to the data and may communicate any changes/updates automatically to data aggregator 136. Data monitor 134 may additionally respond to one or more triggers, such as one or more requests for new synthetic symbols.

Data aggregator 136 may be configured to retrieve the initial aggregated data from database 124 when a user creates a new synthetic aggregation on user device(s) 102. Data aggregator 136 may publish the initial aggregated data to the downstream components with the user's custom identifier (discussed further below). Data aggregator 136 may then begin to calculate and publish updates to synthetic aggregation engine 130 on the fly. In some instances, the aggregated data may be in a JSON format.

Subscription manager 138 may be configured to monitor and maintain a list of symbols, users, and user identifiers accessing computing environment 100. In one non-limiting example, as new synthetic aggregation subscriptions are received from synthetic aggregation engine 130, subscription manager 138 may update its list of active subscription. In another non-limiting example, in response to detecting that no users are actively subscribing to a synthetic symbol, subscription manager 138 may remove the unsubscribed to synthetic symbol from its list.

Figure 2:
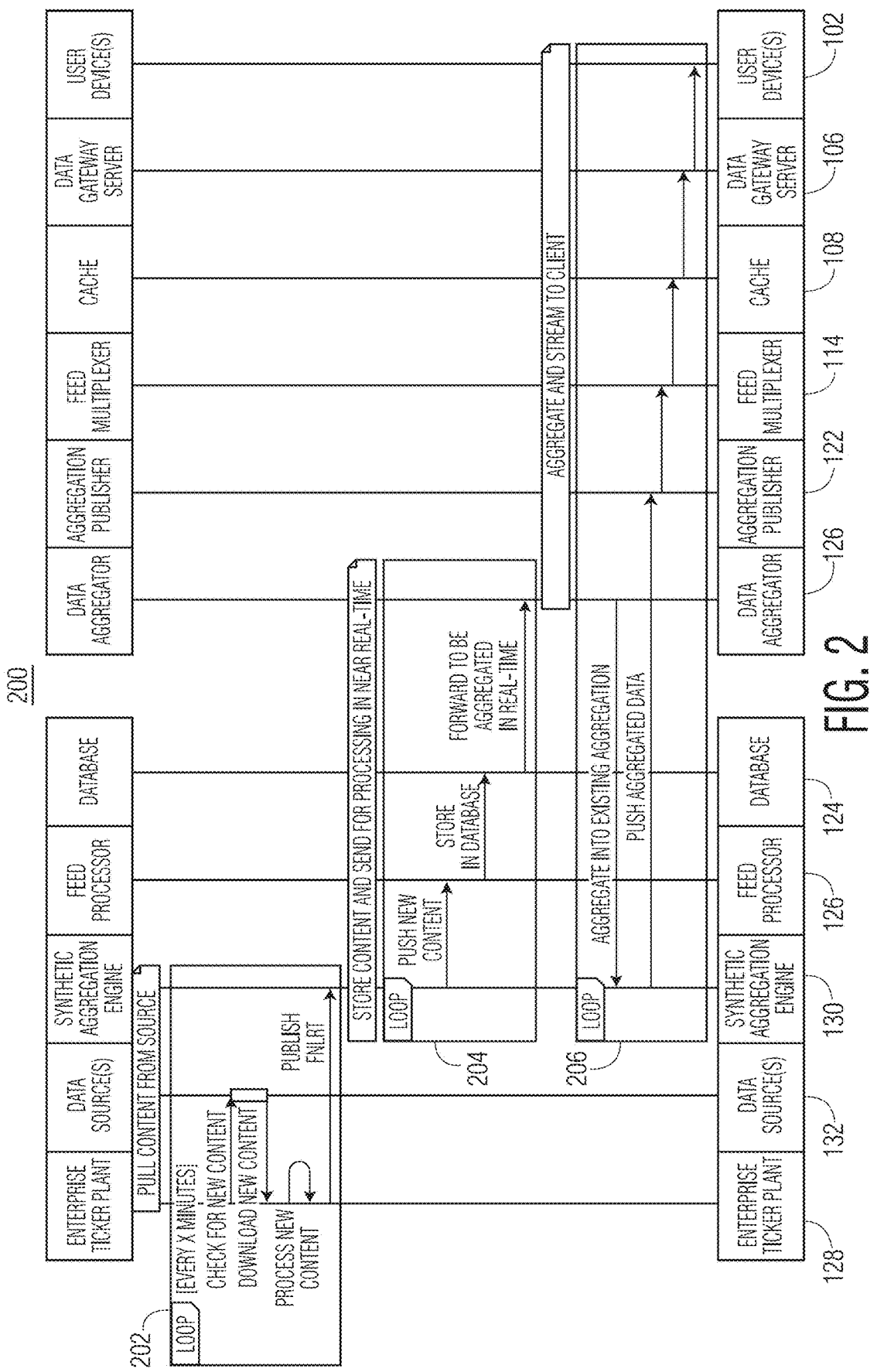
FIG. 2 is a workflow diagram of an example content ingestion and publishing method, according to an aspect of the present disclosure.

Referring to FIG. 2, a workflow diagram of an example content ingestion and publishing method 200 is depicted, according to one or more embodiments of the present disclosure. In one embodiment, the workflow may involve pulling content from at least one data source, storing content, sending the content for processing (in real-time or in near real-time), aggregating the content and streaming the content to the client. At step 202, the enterprise ticker plant 128 may pull content from data source(s) 132 on a periodic basis (e.g., every 10 second, 5 minutes, 10 minutes, hour, etc.) and/or in accordance with a predetermined schedule or trigger(s). The process (in step 202) may run in a loop that monitors the data source(s) 132 for new content, downloads the new content, processes the new content, and publishes the new content to synthetic aggregation engine 130.

At step 204, synthetic aggregation engine 130 may distribute the new content to the feed processor 126, which in turn may distribute the new content to database 124. Database 124, in turn may capture any changes (e.g., updated data values for synthetic symbols). The new content may then be forwarded to data aggregator 136 in real-time to be aggregated.

At step 206, the data aggregator 136 may receive the new content. Data aggregator 126 may then aggregate both new and existing content data as appropriate (i.e., according to any user defined and product defined requirements of the synthetic symbol). Data aggregator may push the aggregated data (including the new content) to the aggregation publisher 122 via the synthetic aggregation engine 130. The new content may then be distributed to the feed multiplexer 114. Feed multiplexer 114 may ingest the new content, and couple the new content with authorization information for consumption by one or more downstream components. The feed multiplexer 114 may then distribute the new content to the cache 108 where the new content may be stored in a distributed fashion. In some examples cache 108 may store the new content such that the new content is geographically as close as possible to the user device(s) 102 that requested new content. The new content may then be distributed to the data gateway server 106. Data gateway 106 may prepare the new content for transmission to each individual user device(s) 102 that requested and/or is subscribed to the synthetic symbol associated with the new content. Notably, computing environment 100 may loop through steps 202, 204, and 206 (and their corresponding sub-steps) on an ongoing basis or in response to certain triggers or requests.

Figure 3:
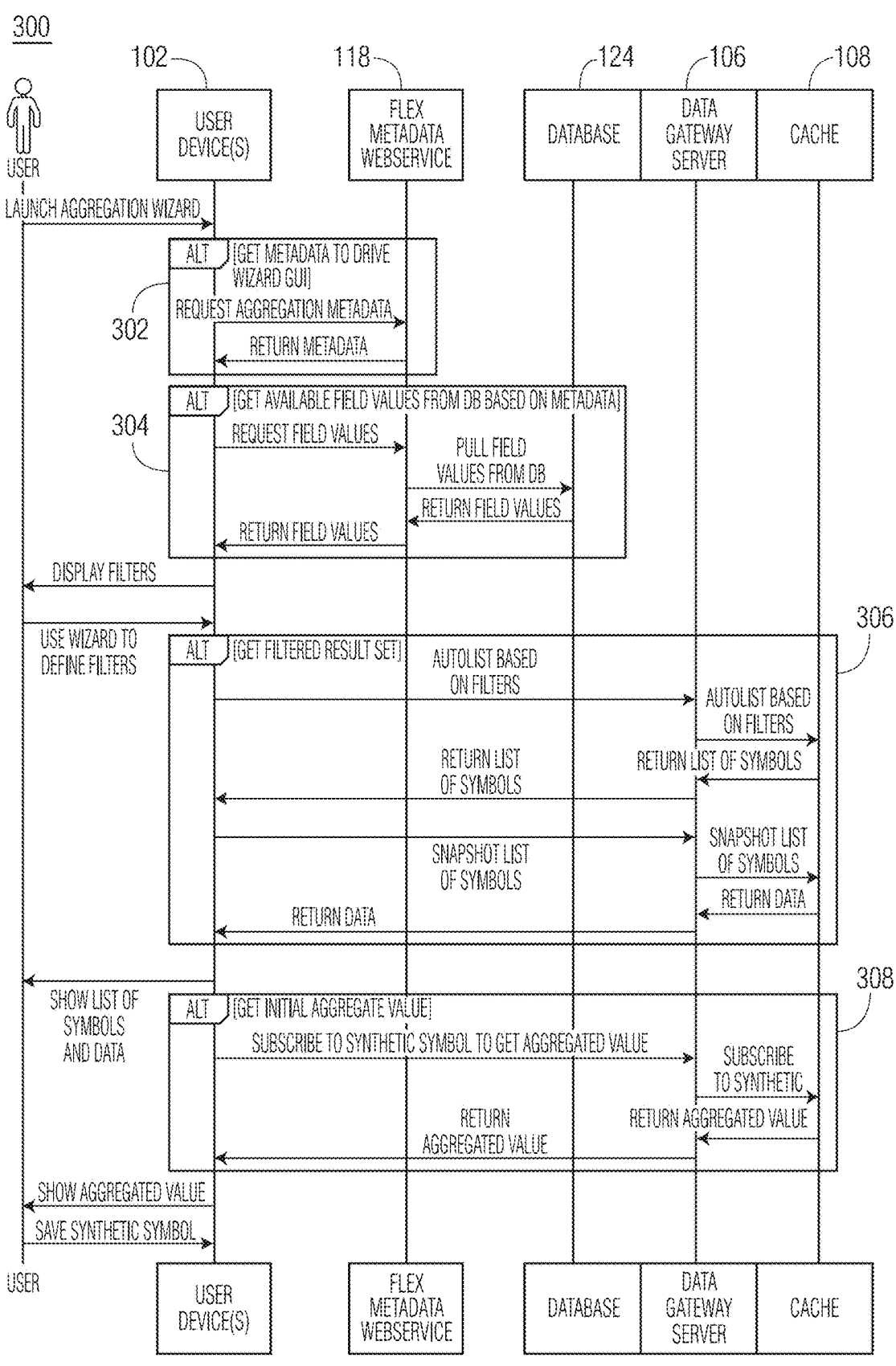
FIG. 3 is a workflow diagram of an example synthetic aggregation and symbol creation method, according to an aspect of the present disclosure.

Referring next to FIG. 3, a workflow diagram of an example synthetic aggregation and symbol creation method 300 is depicted, according to an aspect of the present disclosure. In one embodiment the workflow involves retrieving metadata to operate synthetic aggregation wizard 142, retrieving available field values from database 124 based on the metadata, retrieving a filtered result set, and retrieving an initial aggregate value for a synthetic symbol. At step 302, user device(s) 102 may request aggregation of metadata from flex metadata webservice 118. Flex metadata webservice 118 may then prepare to pull the unique values of a given field (as defined by UIC dictionary 144) from database 124 in real-time. Flex metadata webservice 118 may return or push metadata to user device(s) 102 where it can be manipulated by synthetic aggregation wizard 142.

At step 304, user device(s) 102 may request field values associated with a synthetic symbol and transmit the request to computing environment 100 where it is received by flex metadata webservice 118. Flex metadata webservice 118 may then pull field values from database 124. The field values may then be returned to the flex metadata webservice 118, and the field values may be distributed to user device(s) 102. In response to returning field values to user device(s) 102, synthetic aggregation wizard 142 may display filters that are unique to the synthetic symbol associated with the field values.

At step 306, synthetic aggregation wizard 142 operating on user device(s) 102 may receive one or more user-customized filter set(s), which are ultimately transmitted to the data gateway server 106. Here, as the synthetic symbol is being created, the application may send the synthetic symbol to the data gateway server 106 to auto-list the data that meets the supplied user-customized filter set(s). The data gateway server 106 will communicate with the cache 108 to auto-list the synthetic symbol. In response, the cache 108 will return a list of symbols to the data gateway server 106, which will ultimately be returned to user device(s) 102. A snapshot of the list of synthetic symbol(s) that a user operating user device(s) 102 requests is captured at the user device(s) 102 and returned to the data gateway server 106, where it is then further transmitted to cache 108. In response, cache 108 will then return data associated with the list of synthetic symbol(s) to the data gateway server 106, where the data is further transmitted to the user device(s) 102. Once received at user device(s) 102 the list of symbols and data associated with the symbols are then displayed via synthetic aggregation wizard 142.

At step 308, user device(s) 102 may submit a request to subscribe to the synthetic symbol to get aggregated values associated with the synthetic symbol. This request may be received by data gateway server 106, where it is then further transmitted to cache 108. The aggregated data associated with the synthetic symbol may then be pulled from cache 108 and transmitted to the data gateway server 106, where it is then ultimately transmitted to user device(s) 102. Once received at user device(s) 102, the aggregated value data is populated in appropriate fields and regions of interactive GUI 146 within synthetic aggregation wizard 142. In addition, the synthetic symbol may be saved to synthetic aggregation wizard 142, and all the details of the filter criteria and dataset may be embedded with the synthetic symbol.

In some examples, the subscription request for a synthetic symbol may conform to a particular syntax and grammar rules, so that the synthetic symbol may be easily shared and subscribed to by other users. For example, in one embodiment, the syntax of a synthetic symbol may be composed according to the following format outlined in table 1 below:

AGG@ALIAS1|Data:    Platts|Loading:HOU|Discharge:
   MEX|Product:OIL,GAS.

TABLE 1

| Synthetic Symbol Syntax and Grammar Ruler | | |
|---|---|---|
| GRAMMAR RULES | | |
| Synthetic syntax: symbol_type '@' alias parameter(s) | | |
| Section of Syntax | Syntax Name/Type | Example Given |
| Symbol_type | Symbol name | 'AGG' |
| Alias | Characters | Alias1 |
| Parameters | '\|' key '=' value | Data:\|Loading: \|Discharge:\|Product: |
| Values | Characters | Platts\|HOU\|MEX\|OIL, GAS |

Accordingly, in one embodiment, an example of a query/subscription request may include

```
{
    "subscription_time": UTC,
    "Symbol":"AGG@Token=UserID-PFT",
    "UserID": "arunnarula",
    "Command": "Subscribe"  OR  "delete",
    "FilterQuery":"Source=Platts|PORTNAME=Houston,Newark|PRODUCT=MEX|PROD
    UCTGROUP=OIL,GAS|Size > 1000 AND Size <10000|"
}
```

Figure 4:
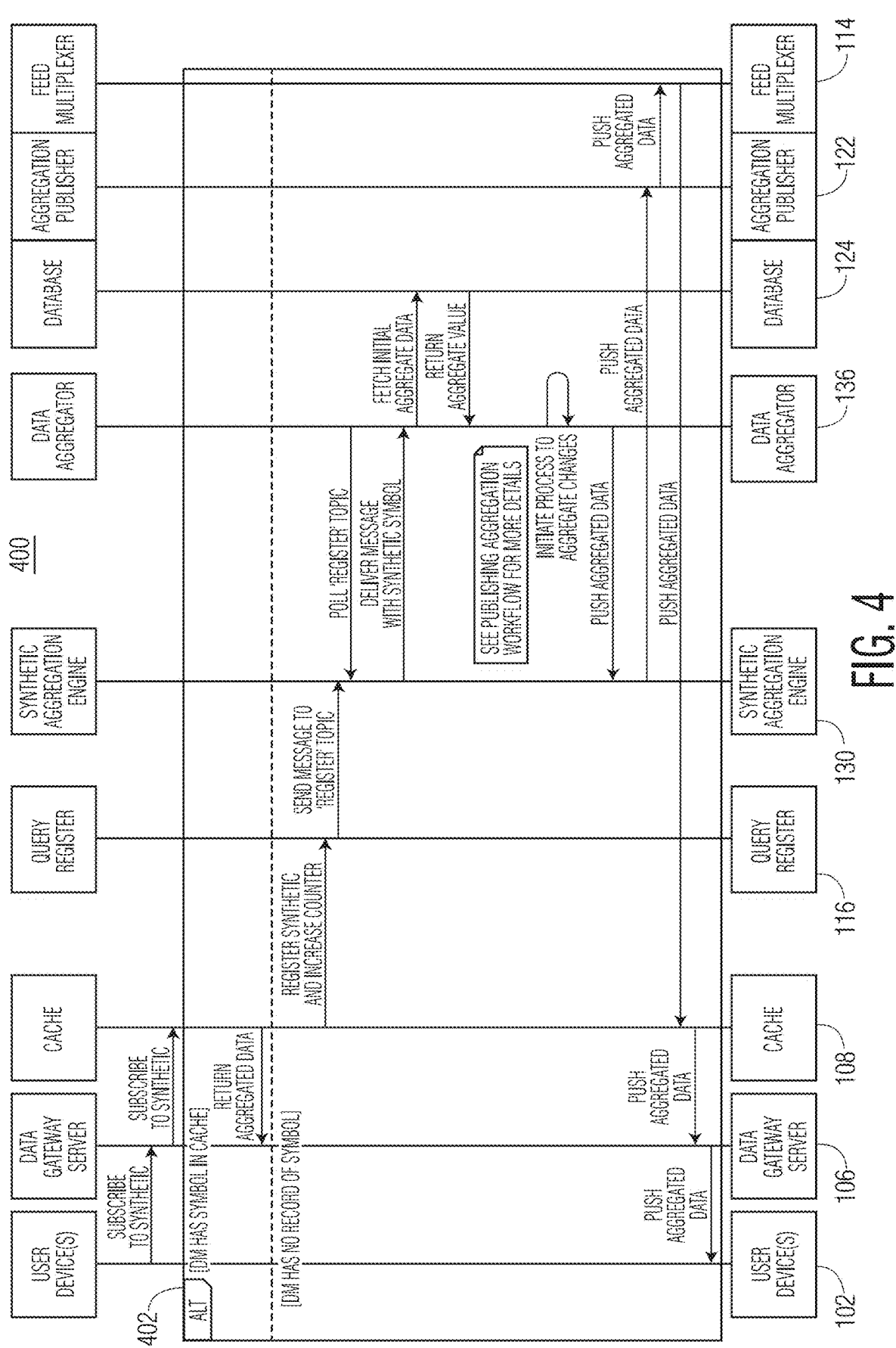
FIG. 4 is a workflow diagram of an example method for requesting data for synthetic aggregation, according to an aspect of the present disclosure.

Referring now to FIG. 4, a workflow diagram of an example method for requesting data for synthetic aggregation 400 is depicted, according to one or more embodiments of the present disclosure. In one instance, a user may subscribe to a synthetic symbol on user device(s) 102 and transmit the request to the data gateway server 106. The data gateway server 106 may then transmit the subscription request to cache 108. At step 402, in response to determining that cache 108 has the symbol in cache, aggregated data may be returned to the data gateway server 106 to be further transmitted back to the user device(s) 102.

In addition, or alternatively, it may be determined that the cache 108 has no record of the synthetic symbol requested by the user. Accordingly, in response to receiving a request from user device(s) 102 to subscribe to a synthetic symbol, the request may be transmitted from the cache 108 to the query register 116.

The query register 116 may then publish a message to the synthetic aggregation engine 130 that signals that that there is a new request for a synthetic symbol. Notably the message may include a topic (e.g., NewSyntheticRequest) which signals that the purpose of the message is to request a new synthetic symbol. The message may then be delivered to the data aggregator 136, which in response to receiving the message fetches initial aggregate data (also referred to as aggregated values) from database 124. Notably, in addition or in the alternative, the data aggregator 136 may poll the synthetic aggregation engine 130 for topics (e.g., registered topics) on an ongoing basis. The aggregate data is then returned to the data aggregator 136, where a process is initiated to publish the aggregated data associated with the synthetic symbol.

The aggregated data is then pushed to the synthetic aggregation engine 130. Synthetic aggregation engine 130 may further push the aggregated data to the aggregation publisher 122, where the aggregated data may be converted into a proprietary feed format for downstream components. Once the aggregated data is converted at the aggregation publisher 122, the (converted) data may be pushed to the feed multiplexer 114.

The feed multiplexer 114 may then add authorization information to the aggregated data (which has now been converted to a proprietary feed) and distribute the aggregated data to the cache 108. The cache 108 may store the aggregated data in one or more storage devices that are geographically closer in proximity to the user device(s) 102 that sent the subscription request. In this manner, cache 108 may reduce latency in publishing the aggregated data to the user device(s) 102. The aggregated data may then be pushed to the data gateway server 106, where it may then distributed to the individual user device(s) 102 that subscribed to the synthetic symbol.

Figure 5:
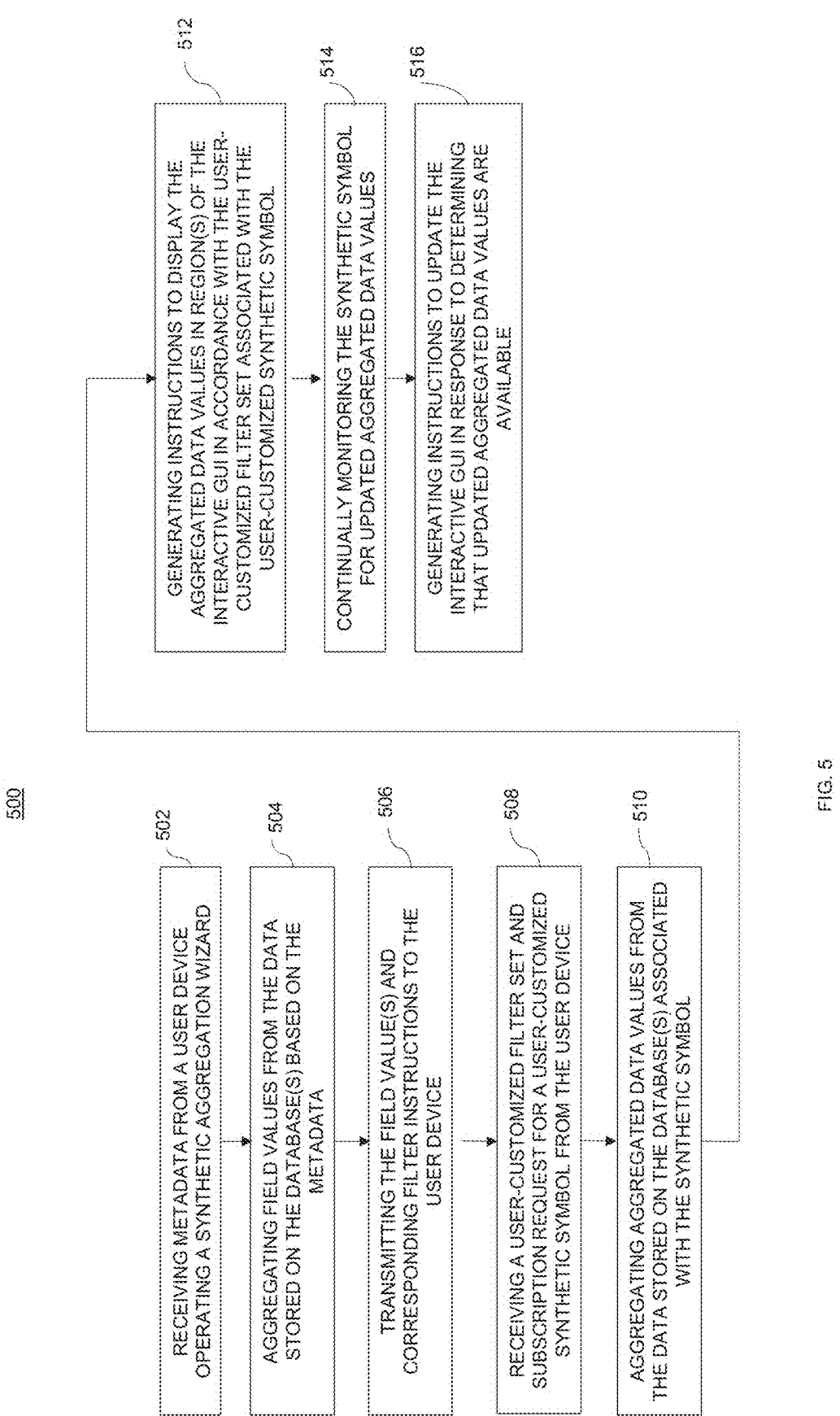
FIG. 5 is a flowchart diagram of an example method for receiving a request to create and subscribe to a synthetic symbol, according to an aspect of the present disclosure.

Referring to FIG. 5, a flowchart diagram of an example method 500 for receiving a request to create and subscribe to a user-customized synthetic symbol is depicted, according to one or more embodiments of the present disclosure. At step 502, server(s) in communication with computing environment 100, may receive metadata from interactive GUI 146 of a user device, where the user device is configured to operate synthetic aggregation wizard 142 such that synthetic aggregation wizard 142 generates interactive GUI 146. For example, a user operating client device(s) 102 may desire to generate and subscribe to a user-customized synthetic symbol (e.g., a symbol representing the volume of imports and exports of oil between two ports and data related to the vessels that carry the oil). In furtherance of creating this request, the user device(s) 102 may receive input from the user via interactive GUI 146 operating in synthetic aggregation wizard 142. In response to receiving the input from the user, the user device(s) 102 may transmit metadata to one or more servers (e.g., data gateway server 106) operating within computing environment 100 to fulfill the user's request.

At step 504, in response to receiving the metadata, the server(s) may aggregate one or more field values from the data stored on database 124 based on the metadata. For example, the server(s) (e.g., flex metadata webservice 118) may pull field values from database 124. The field values may include symbol-specific attributes that are leveraged as labels by interactive GUI 146 to enable a user to manipulate data related to the symbol. The server(s) (e.g., flex metadata webservice 118, data gateway server 106, and cache 108) may additionally aggregate symbol specific filters that enable a user to filter data related to the symbol. For example, the server(s) (e.g., flex metadata webservice 118, data gateway server 106, and cache 108) may aggregate data related to oil producing ports and vessels that transport oil, in order to populate interactive GUI 146 with field values that enable a user, via synthetic aggregation wizard 142, to select certain ports and vessels, and filter data accordingly. The server(s), at step 504, may also generate one or more filter instructions based on the received metadata (and, in some examples, also based on the aggregated field values).

At step 506, the server(s)) (e.g., data gateway server 106) may transmit the one or more field values and corresponding filter instructions to the user device(s) 102, such that the one or more field values and the filter instructions are displayed on interactive GUI 146. Here, synthetic aggregation wizard 142 may dynamically modify certain regions of interactive GUI 146 to display field values and filter instructions. In some examples, the filter instructions may be used to generate one or more filters available to the user for creating customizable filter set.

At step 508, the server(s) (e.g., data gateway server 106) may receive a user-customized filter set and subscription request for a synthetic symbol associated with the user-customized filter set from the user device, wherein the user-customized filter set and subscription request are transmitted in response to the one or more field values and filter instructions. Here, in response to receiving the field values and filter instructions, the user operating user device(s) 102 may select one or more user-customized filters and request to subscribe to the synthetic symbol via interactive GUI 146. In furtherance of this request, the user device(s) may transmit the user-customized filter set and the subscription request, collectively referred to as a query, to the server(s) (e.g., data gateway server 106).

At step 510, the server(s) (e.g., flex Middle Tier 120) may aggregate one or more aggregated data values from the data stored on the database(s) 124 associated with the synthetic symbol. For example, the server(s) (e.g., flex Middle Tier 120) may aggregate data values and time series data associated with the symbol the user requested to be subscribed to. For example, the server(s) (e.g., flex Middle Tier 120) may aggregate values related to how many vessels are leaving or entering one or more ports to transport oil and how many barrels of oil are sitting at a particular port. In addition, in order to generate time-series data for the symbol, the server(s) (e.g., the flex middle tier 120) may include logic to create sum/average calculations based on aggregated data that may produce time-series data (including, in some examples with day resolution). Moreover, the server(s) (e.g., the history server 110) may be configured to produce historical information aggregation data related to a synthetic symbol that may be leveraged by the server(s) (e.g., the flex middle tier 120) to generate time-series data for a synthetic symbol or varied periods of time (e.g., weekly, monthly, quarterly, and yearly).

At step 512, the server(s) (e.g., data gateway server 106 and cache 108) may generate instructions to display the one or more aggregated data values in one or more regions of interactive GUI 146 in accordance with the user-customized filter set associated with the (user-customized) synthetic symbol. Given, that each synthetic symbol may have unique attributes, the server(s) (e.g., data gateway server 106 and cache 108) may generate instructions that cause interactive GUI 146 to display the aggregated data in format that conforms to the user-customized filter set(s) and accurately depicts the data over time of the user-customized synthetic symbol. Notably, the instructions generated by the server(s) (e.g., data gateway server 106 and cache 108) may modify one or more regions of interactive GUI 146, cause interactive GUI 146 to transition between screens, and/or modify one or more options and/or parameters available to a user.

In addition, a user may create an alias for the user-customized synthetic symbol, which may include creating a unique name for the synthetic symbol that can be stored and subscribed to (as described above with respect to Table 1). An alias may be any unique name created by a user with an embedded query, which when subscribed to be a user, prompts the server(s) (as described above) to aggregate data associated with user-customized synthetic symbol.

At step 514, the server(s) (e.g., enterprise ticker plant 128, data aggregator 136 and/or data monitor 134) may continually monitor for updated aggregated values associated with the synthetic symbol. Here, the server(s) (e.g., enterprise ticker plant 128, data aggregator 136 and/or data monitor 134) may monitor for changes in events, records, or underlying data associated with a synthetic symbol in real-time and automatically/dynamically store any updates in cache 108. For example, subsequent to a synthetic symbol for oil import/export being created or subscribed to, the server(s) may monitor for updated data related to oil import/export on an ongoing basis.

At step 516, the server(s) (e.g., enterprise ticker plant 128, data aggregator 136 and/or data monitor 134) may determine that updated aggregated values are available and generate instructions to update interactive GUI 146 in response to receiving the updated aggregated data values. Here, the server(s) (e.g., enterprise ticker plant 128, data aggregator 136 and/or data monitor 134) may determine that additional data associated with a synthetic symbol has become available and generate instructions to dynamically modify interactive GUI 146 with the updated values. For example, in response to determining that updated information related to a synthetic symbol associated with oil import/export is available, the server(s) (e.g., data gateway server 106) may generate instructions that dynamically modify one or more regions of interactive GUI 146 with updated information in real-time, as discussed in more detail below.

Figure 6:
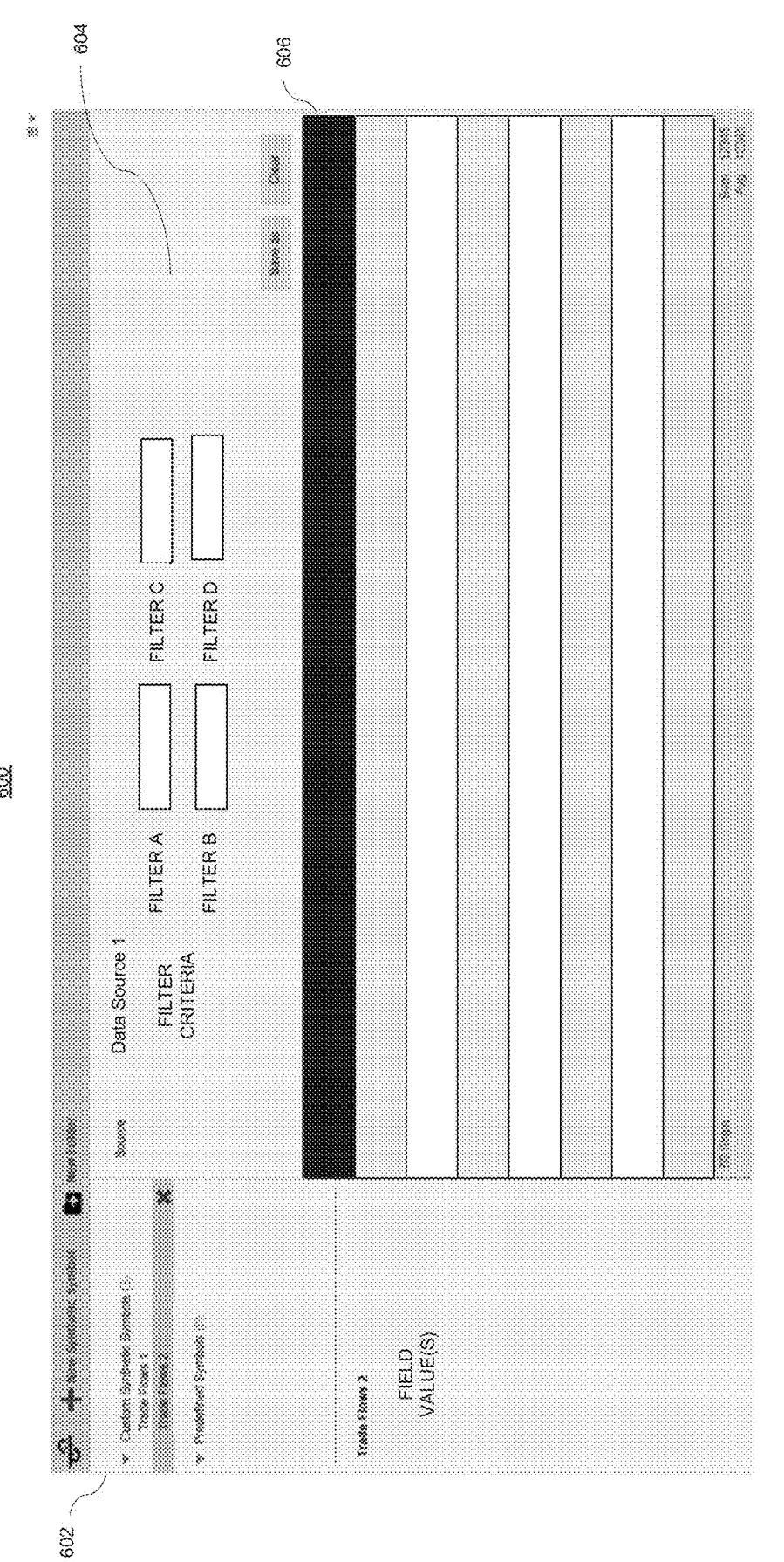
FIG. 6 depicts a synthetic aggregation wizard including an interactive graphical user interface (GUI), according to an aspect of the present disclosure.

FIG. 6 illustrates an interactive GUI 600 depicted, according to various embodiments of the present disclosure. In some instances, the interactive GUI 600 may be a stand-alone application, or a sub-feature (of synthetic aggregation wizard 142) associated within a software product or website. The interactive GUI 600 may be operated by one or more users using one or more user device(s) 102. In some embodiments, interactive GUI 600 initiates and plays an integral role for processes associated with creating, aggregating data for, or subscribing to a user-customized synthetic symbol, as discussed with respond to FIGS. 2-5.

As depicted in FIG. 6, interactive GUI 600 includes several dynamic features for capturing user input related to synthetic symbols. For example, synthetic symbol watchlist region 602 that may include one or more features for listing and manipulating a list of (user-customized) synthetic symbols created by a user and/or a list of predefined lists synthetic symbols. Synthetic symbol watchlist region 602 may additionally include features for subscribing to one or more synthetic symbols. In addition, synthetic symbol watchlist region 602 may include one or more sub-regions for displaying field values related to a synthetic symbol. Synthetic symbol watchlist region 602 may additionally enable users to create aliases for synthetic symbols, thereby allowing users to assign unique names to a query that pulls data associated with a synthetic symbol. This alias may be shareable, such that a user may share the alias (e.g., via a chat box, email, text message, or any communication channel) with one or more additional users, thereby allowing the additional users to subscribe to the alias if they desire.

Interactive GUI 600 may include a data selection region 604 that enables a user to select the specific attributes and/or type of data (e.g., filter criteria) associated with the symbol that is presented to a user. For example, as it relates to oil, a user may be able to input selections pertaining to port cities, oil products, vessel sizes and the like, via one or more input fields or buttons. The user input(s) received in data selection region 604 may additionally serve as parameters for how data is displayed in dynamic results region 606. Once the attributes and/or types of data are selected, the results may be displayed in dynamic results region 606. Dynamic results region 606 may include fields, tables, charts, and the like, wherein the results of user input(s) inputted in data selection region 604 are displayed. Dynamic results region 606 may include features that enable users to filter, sort, or categorize the results that are displayed.

Notably, any of the regions within the interactive GUI may dynamically provide a user with prompts or notifications requesting users to provide information and/or to provide updated information as it relates to one or more new or predefined synthetic symbols. UIC dictionary 144, stored on the user device(s) 102 (and/or stored on server(s) (e.g., Flex metadata webservice 118)) in computing environment 100, may describe characteristics of each field that may be made available to the front-end applications for each synthetic symbol. UIC dictionary 144 may indicate which datasets are available for aggregation as well as what fields can be used to filter the original content. UIC dictionary 144 may additionally describe how to render each field (dropdown, tree menu, radio button), what the field type is (string, number) and other important information to control synthetic aggregation wizard 142.

Figure 7:
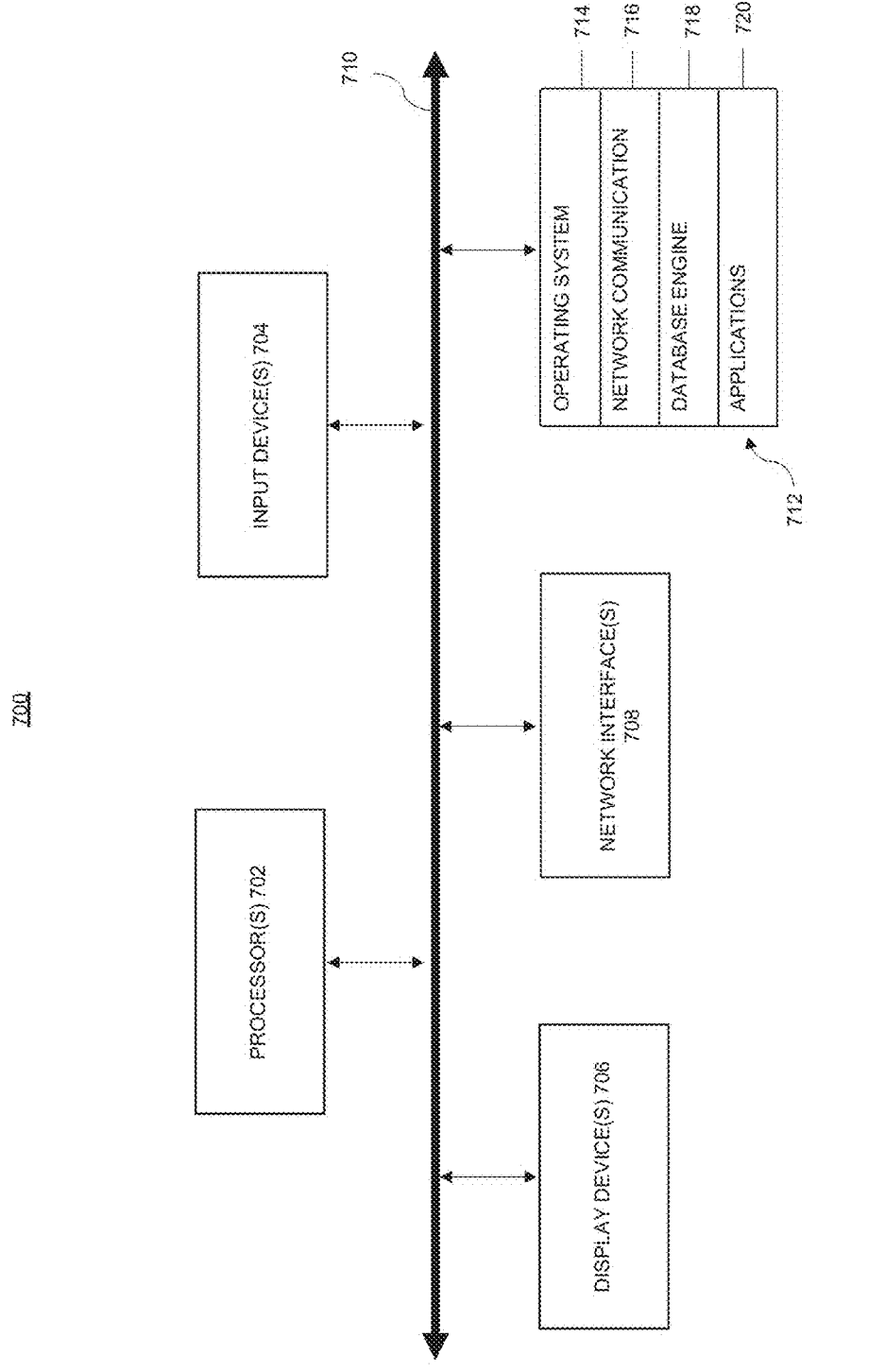
FIG. 7 is a block diagram for a computing device, according to an aspect of the present disclosure.

Referring to FIG. 7, a block diagram for a computing device 700, according to various embodiments of the present disclosure is depicted. For example, computing device 700 may function as a server system (e.g., one or more components) within computing environment 100. The computing device 700 may be implemented on any electronic device that runs software applications derived from compiled instructions, including, without limitation, personal computers, servers, smart phones, media players, electronic tablets, game consoles, email devices, etc. In some implementations, the computing device 700 may include processor(s) 702, (one or more) input device(s) 704, one or more display device(s) 706, one or more network interfaces 708, and one or more computer-readable medium 712 storing software instructions. Each of these components may be coupled by bus 710, and in some embodiments, these components may be distributed among multiple physical locations and coupled by network 140 (FIG. 1).

Display device(s) 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device(s) 704 may be any known input device technology, including but not limited to a keyboard (including a virtual keyboard), mouse, track ball, camera, and touch-sensitive pad or display. Bus 710 may be any known internal or external bus technology, including but not limited to industry standard architecture (ISA), extended ISA (EISA), peripheral component interconnect (PCI), PCI Express, universal serial bus (USB), Serial advanced technology attachment (ATA) or FireWire. Computer-readable medium(s) 712 may be any non-transitory medium that participates in providing instructions to processor(s) 702 for execution, including without limitation, non-volatile storage media (e.g., optical disks, magnetic disks, flash drives, etc.), or volatile media (e.g., synchronous dynamic random access memory (SDRAM), read-only memory (ROM), etc.).

Computer-readable medium(s) 712 may include various instructions for implementing an operating system 714 (e.g., Mac OS®, Windows®, Linux). The operating system 714 may be multi-user, multiprocessing, multitasking, multithreading, real-time, and the like. The operating system 714 may perform basic tasks, including but not limited to one or more of: recognizing input from input device(s) 704; sending output to display device(s) 706; keeping track of files and directories on computer-readable medium(s) 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as transmission control protocol/internet protocol (TCP/IP), hypertext transfer protocol (HTTP), Ethernet, telephony, etc.).

Database processing engine 718 may include instructions that enable computing device 700 to implement one or more methods as described herein. Application(s) 720 may be an application that uses or implements the processes described herein and/or other processes. The processes may also be implemented in operating system 714. For example, application(s) 720 and/or operating system 714 may execute one or more operations to intelligently process queries for synthetic symbols.

The described features may be implemented in one or more computer programs that may be executable on a programmable system including at least one programmable processor coupled to receive data and instructions from, and to transmit data and instructions to, a data storage system (e.g., database 124), at least one input device, and at least one output device. A computer program is a set of instructions that can be used, directly or indirectly, in a computer to perform a certain activity or bring about a certain result. A computer program may be written in any form of programming language (e.g., Janusgraph, Gremlin, Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as erasable programmable ROM (EPROM), electrically EPROM (EEPROM), and flash memory devices; magnetic disks such as internal hard disks and removable disks; magneto-optical disks; and compact disk-ROM (CD-ROM) and digital versatile disk-ROM (DVD-ROM) disks. The processor and the memory may be supplemented by, or incorporated in, application-specific integrated circuits (ASICs).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Examples of an Interactive GUI

Figures 9A, 9B:
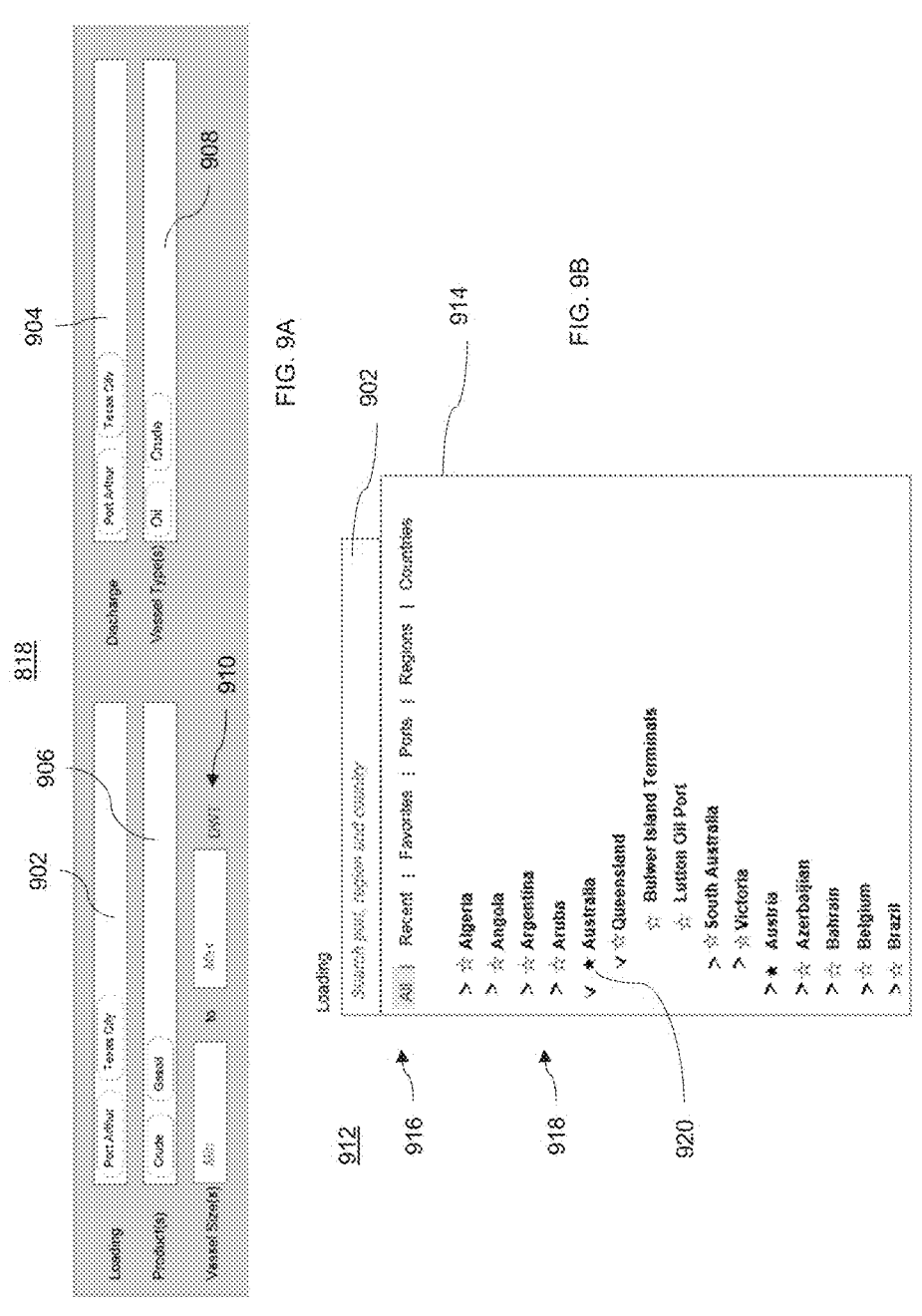
FIGS. 9A, 9B, 9C, 9D, 9E, 9F, 9G, 9H and 9I are screenshots of an example query filter region of the interactive GUI of FIG. 8A, according to an aspect of the present disclosure.
Figure 9D:
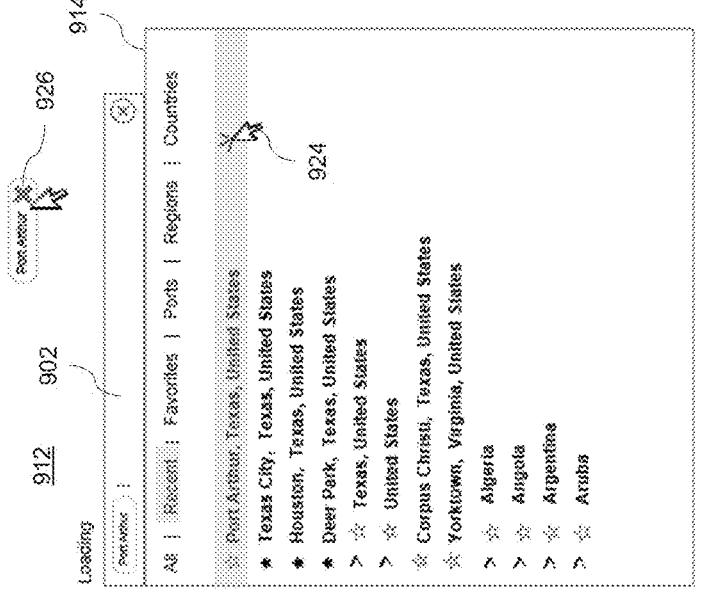
Figure 9C:
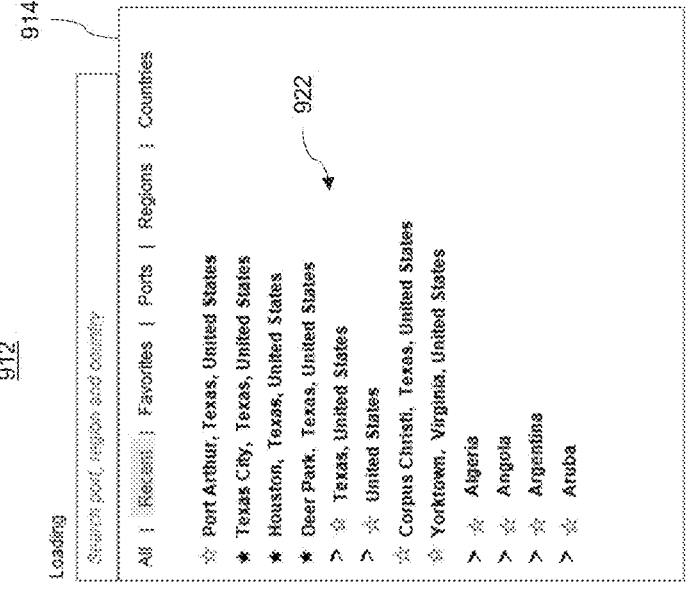
Figures 9E, 9F:
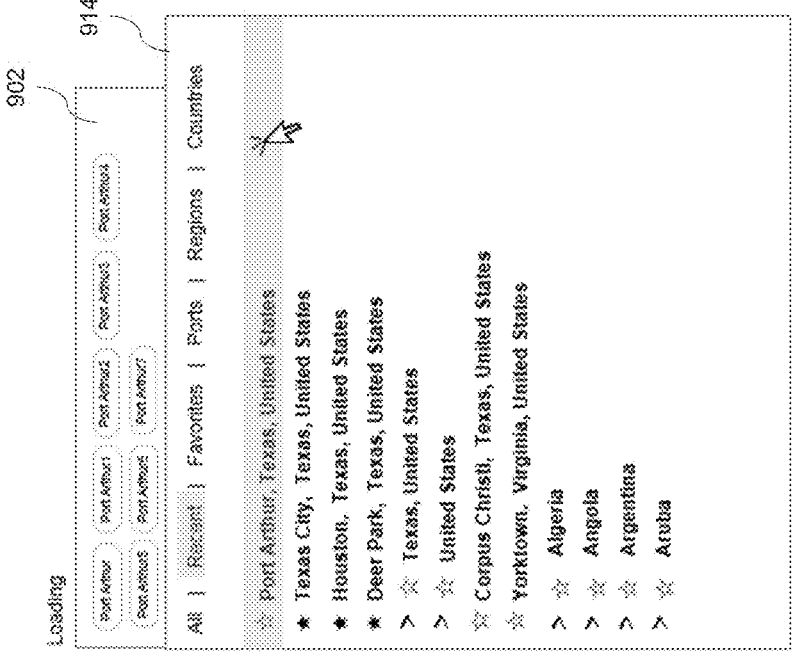
Figure 9H:
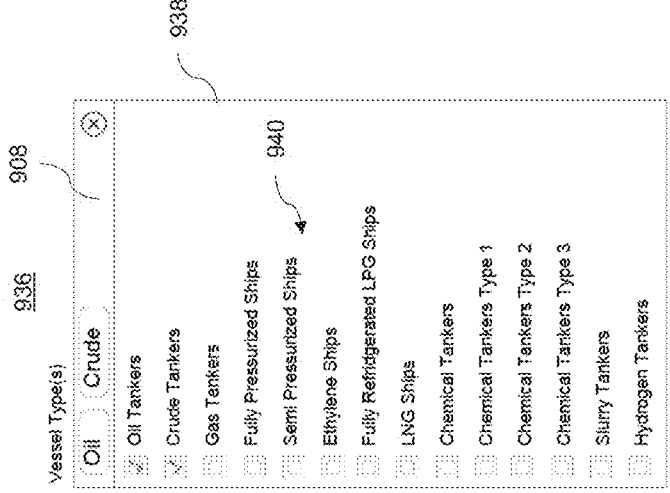
Figure 9G:
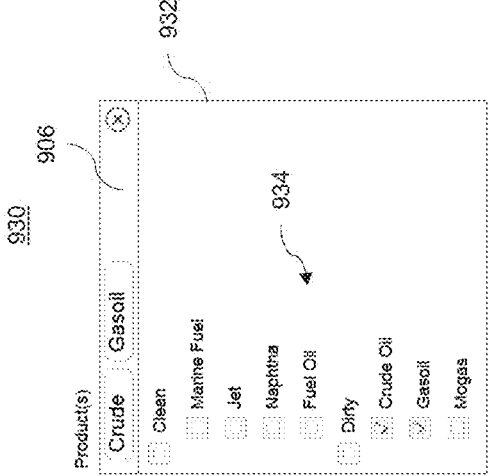
Figure 9I:
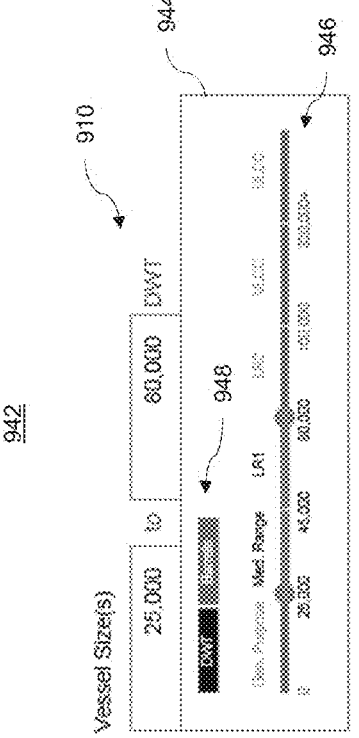
Figure 10A:
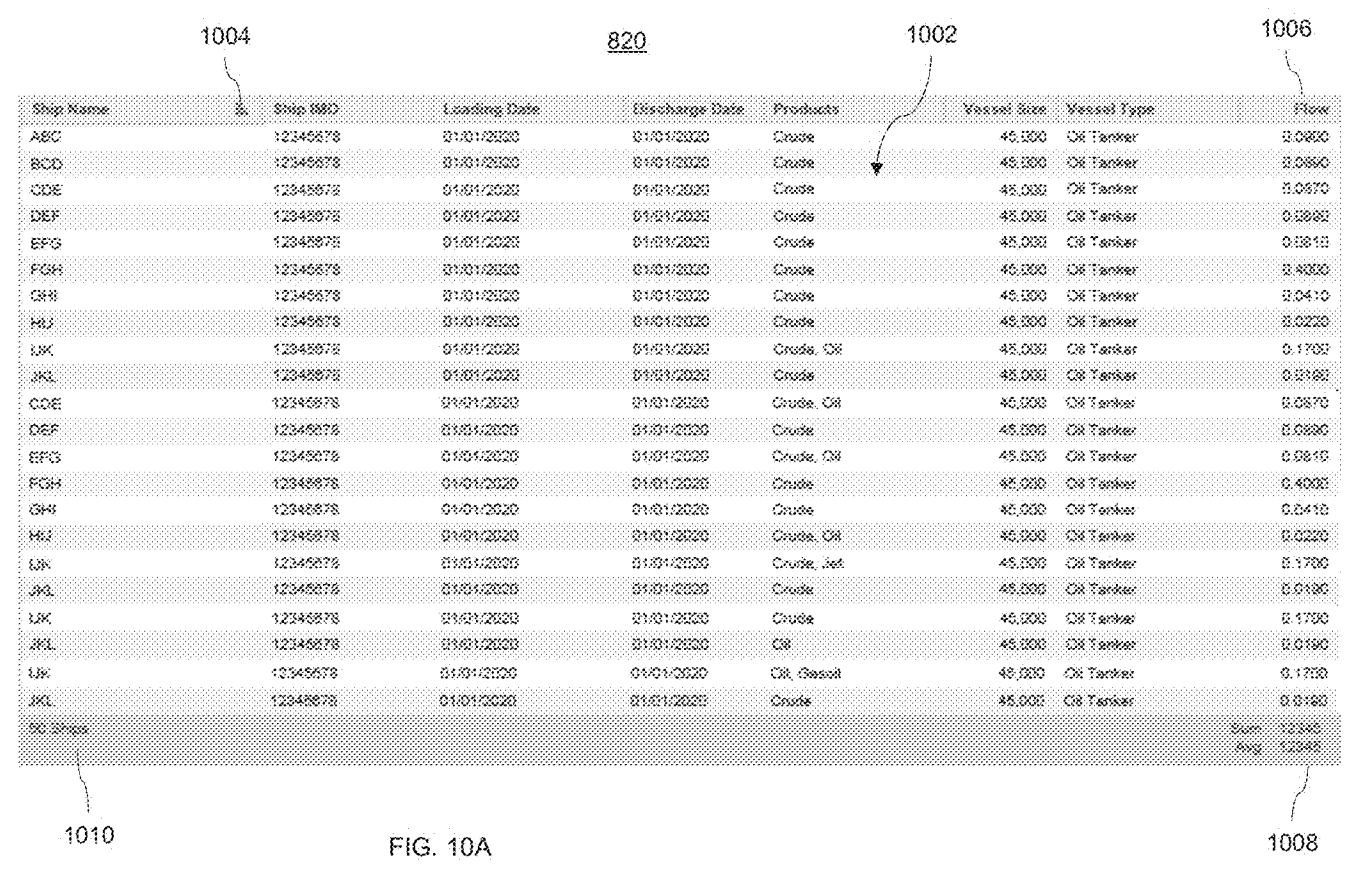
Figure 10B:
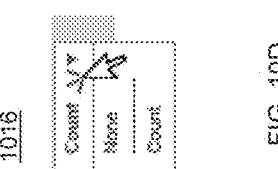
Figure 10C:
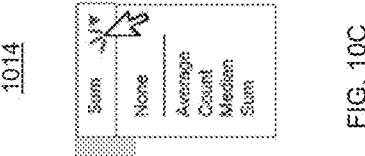
Figure 10D:
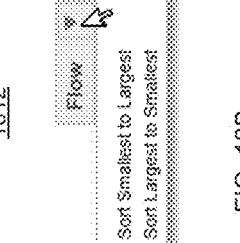
Figure 11A:
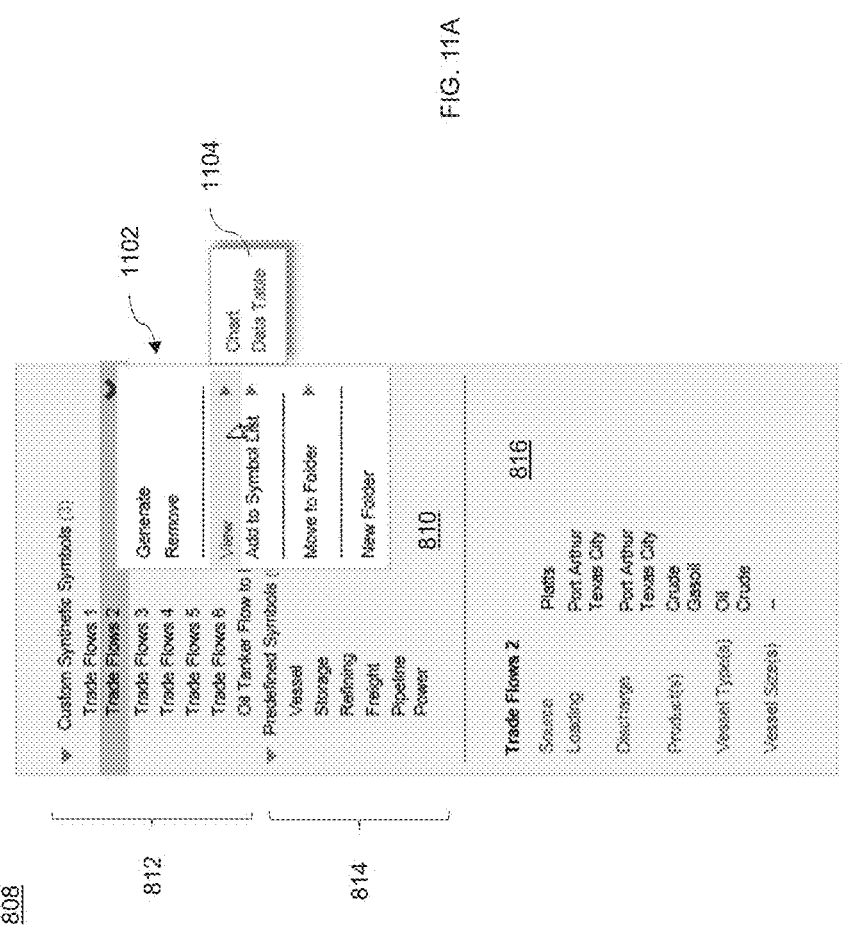
FIGS. 11A and 11B are screenshots of an example synthetic symbol selection region of the interactive GUI of FIG. 8A, according to an aspect of the present disclosure.
Figure 11B:
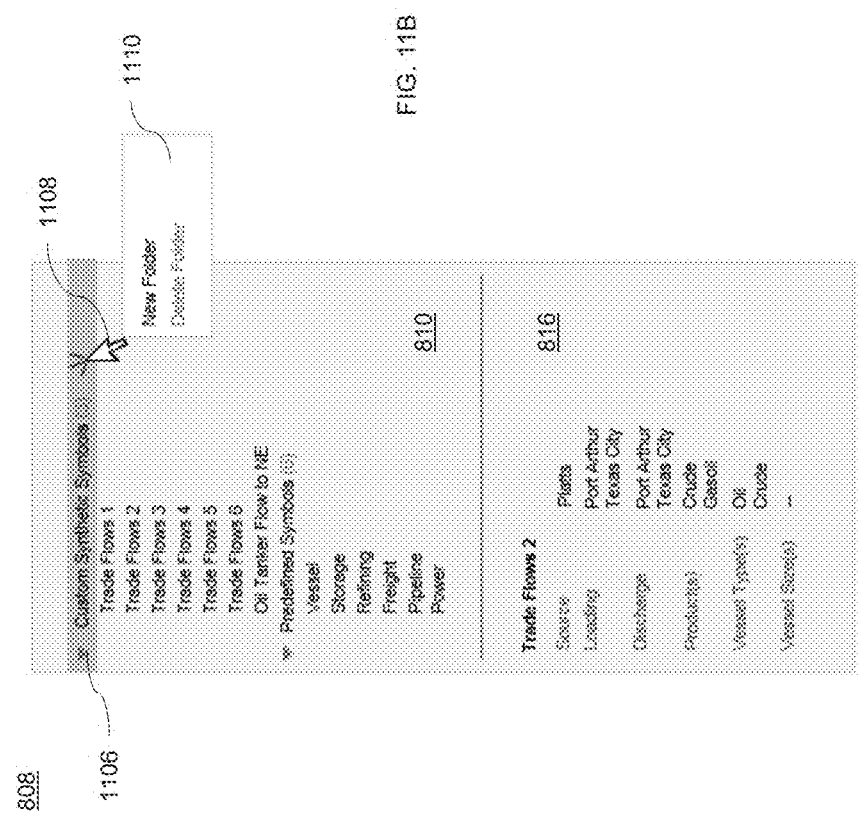

Next, examples of interactive GUI 800 having synthetic aggregation wizard 142 are described with respect to FIGS. 8A-11B. Interactive GUI 800 may provide interactive tools for viewing, editing and creating data aggregation queries associated with commodities data. In particular, FIGS. 8A-8E are screenshots of example interactive GUI 800; FIGS. 9A-9I are screenshots of example query filter region 818 of interactive GUI 800; FIGS. 10A-10D are screenshots of example dynamic results region 820 of interactive GUI 800; and FIGS. 11A and 11B are screenshots of example synthetic symbol selection region 808 of interactive GUI 800. It should be understood that FIGS. 8A-11B represents a non-limiting example user interface, and that a differing interface configured in accordance with this disclosure may be provided for viewing, editing and creating data aggregation queries associated with commodities data. Although interactive GUI 800 illustrates an example of commodities data that includes energy commodities (e.g., oil), interactive GUI 800 is not limited to energy commodities data, and may be used with any suitable type of commodity (e.g., metal, livestock, meat and/or agricultural commodities), natural resource and/or any other desired type of data, as well as any desired combination of types of data.

Figure 8A:
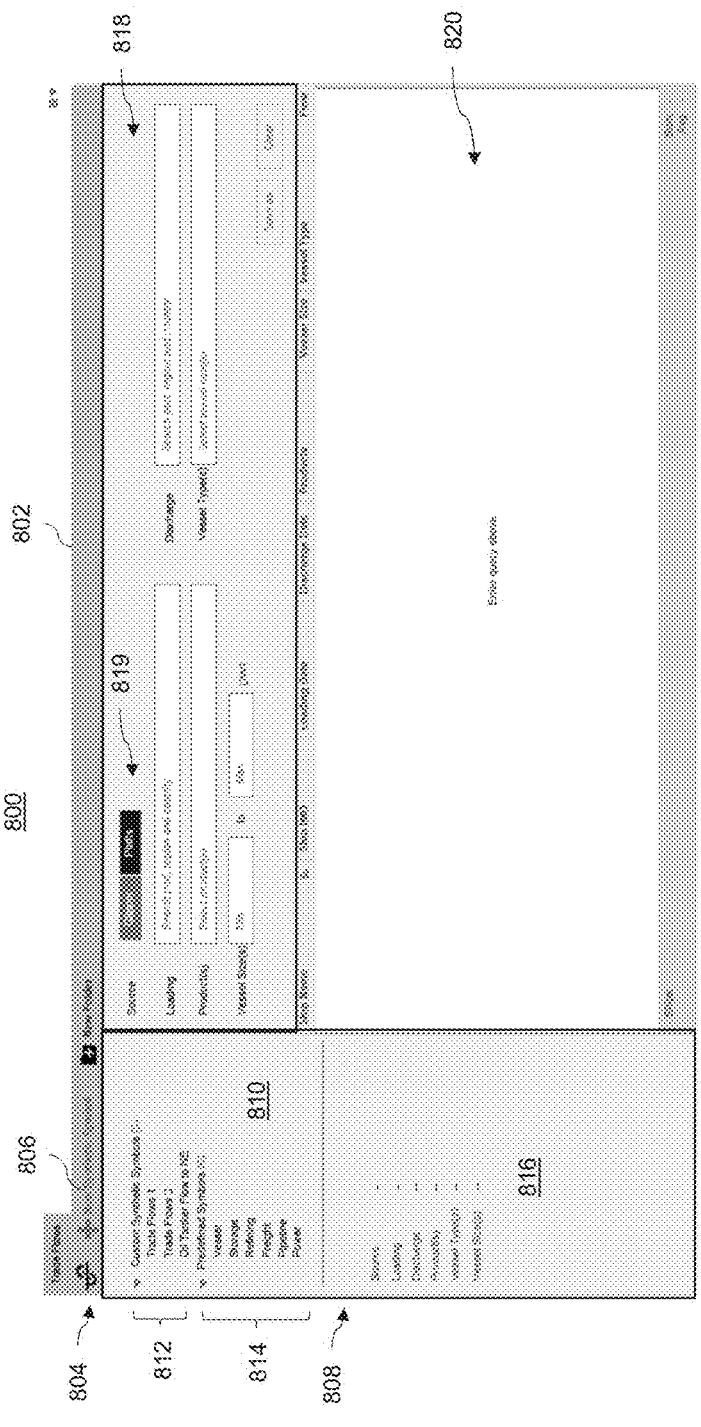
FIGS. 8A, 8B, 8C, 8D and 8E are screenshots of an example interactive GUI having a synthetic aggregation wizard providing interactive tools for viewing, editing and creating data aggregation queries associated with commodities data, according to an aspect of the present disclosure.

Referring to FIG. 8A, in some examples, interactive GUI 800 may include one or more windows, such as data aggregator window 802 (referred to herein as window 802). In some examples, window 802 may include toolbar 804, synthetic symbol selection region 808, query filter region 818 and dynamic results region 820. In general, the various regions of window 802 may function as a tool that allows users to create new synthetic symbols (having user-customized filter sets associated with various data aggregation queries), reference existing synthetic symbols (e.g., both predefined and user-created synthetic symbols) and edit existing queries (via the various synthetic symbols). Window 802 illustrates an example new query window prior to any query results, such that input fields of query filter region 818 are blank, and no data is shown in dynamic results region 820. In some examples, window 802 may be displayed when interactive GUI 800 is initially displayed. In some examples, window 802 may be displayed when an existing query is cleared.

Toolbar 804 may include new synthetic symbol icon 806 (herein icon 806) for the creation of a new query, which new query may be saved as a custom synthetic symbol. In some examples, selection of icon 806 may cause (new query) window 802 to be displayed, thereby providing blank input fields in query filter region 818. In some examples, toolbar 804 may include one or more other user-selectable icons, such as a new folder icon.

Synthetic symbol selection region 808 may include folder region 810 and symbol query information region 816. Folder region 810 may include custom folder 812 and predefined folder 814. In general, folder region 810 may display existing synthetic symbols (both user-customized and predefined symbols) for selection by a user. Symbol query information region 816 may display the query (e.g., a filter set) associated with a particular symbol in folder region 810. In some examples, region 816 may display the query for a particular symbol when that symbol is hovered over (e.g., via a pointing device). In some examples, region 816 may display the query of a currently selected symbol when no symbol is hovered on (in folder region 810).

Custom folder 812 may display one or more user-selectable custom synthetic symbols previously created by the user (and/or, in some examples, shared by another user). Custom folder 812 may be created by the user, and may allow for user customization for (without being limited to) naming of custom synthetic symbols, an order of the custom synthetic symbols and/or a hierarchy of the custom synthetic symbols displayed in custom folder 812. Although one custom folder 812 is shown, in some examples, custom folder 812 may include more than one folder. In some examples, one or more custom folders 812 may allow for user customization of folder naming.

Predefined folder 814 may display one or more user-selectable predefined synthetic symbols associated with respective predefined queries (e.g., filter sets) created by the system itself. In some examples, the predefined synthetic symbols (in predefined folder 814) may not be deleted by the user. In some examples, the predefined synthetic symbols that may be displayed may depend on the user (e.g., based on what specific data the user is subscribed to). In some examples, custom folder 812 and predefined folder 814 may include a carat selector to expand or collapse the display of synthetic symbols in the respective folders. Folder region 810 is described further below with respect to FIGS. 11A and 11B.

In operation, selection of a symbol in folder region 810 may cause query filter region 818 to load the filter set of the query for the existing symbol in the corresponding fields of query filter region 818. In addition, (custom and/or pre-defined) synthetic symbols in window 802 may be selectable by a user via a drag and drop operation. One or more of the synthetic symbols (in folder region 810) may be dragged and dropped within folder region 810 (e.g., to move the synthetic symbol(s) among those symbols in respective custom folder 812 and predefined folder 814). As another example, (custom and/or predefined) synthetic symbols may be dragged into or out of folder region 810 to or from other widgets (e.g. a watchlist, a chart, a data table, etc.).

Query filter region 818 may include one or more user input fields for creating a filter set (e.g., having filter criteria) for a new query, viewing an existing query and/or modifying an existing query (associated with an existing filter set) to perform a data aggregation query. Specific user input fields of query filter region 818 are described further below with respect to FIGS. 9A-9I. Query filter region 818 may also include one or more buttons for saving a query or clearing an existing query (e.g., "Save as" button and "Clear" button 832 shown in FIG. 8C). As discussed above, user input fields of query filter region 818 may be empty (e.g., blank) (e.g., initially, upon selecting new synthetic symbol icon 806 and/or after a query is cleared). In some examples, user input fields of query filter region 818 may be populated with field values responsive to selecting a synthetic symbol in folder region 810 (i.e., for an existing query).

In some examples, query filter region 818 may include source selector 819 for selecting among one or more data sources (e.g., "Clipper" and "Platts"). Source selector 819 may be configured to allow selection of data from one or more available datasets. In some examples, datasets available to a user may depend on a user subscription (e.g., a user entitlement) to particular dataset(s). In a non-limiting example, the "Platts" data source selection may cause query filter region 818 to include user input fields for geographic information (e.g., loading/lading and discharge/unlading), vessel size and product, and may generate aggregated data (in dynamic results region 820) that may include flow and vessel count. In a non-limiting example, the "Clipper" data source selection may cause query filter region 818 to include user input fields for loading/lading, discharge/unlading, vessel size, vessel type, product, draught and flag (e.g., country), and may generate aggregated data (in dynamic results region 820) that may include flow, vessel count, ship capacity and (additionally, in some examples) freight charge.

Dynamic results region 820 may be configured to display the results (obtained from database 124) responsive to a query entered and/or modified in query filter region 818 and/or selection of an existing synthetic symbol in folder region 810. In general, data aggregation results displayed in dynamic results region 820 may be dynamic in that the results may be updated in real-time or near-real-time (e.g., responsive to data monitor 134) as the underlying data in database 124 changes. In addition, the data aggregation results may be driven by user inputs, via query filter region 818. Dynamic results region 820 is described further below with respect to FIGS. 10A-10D.

Figure 8B:
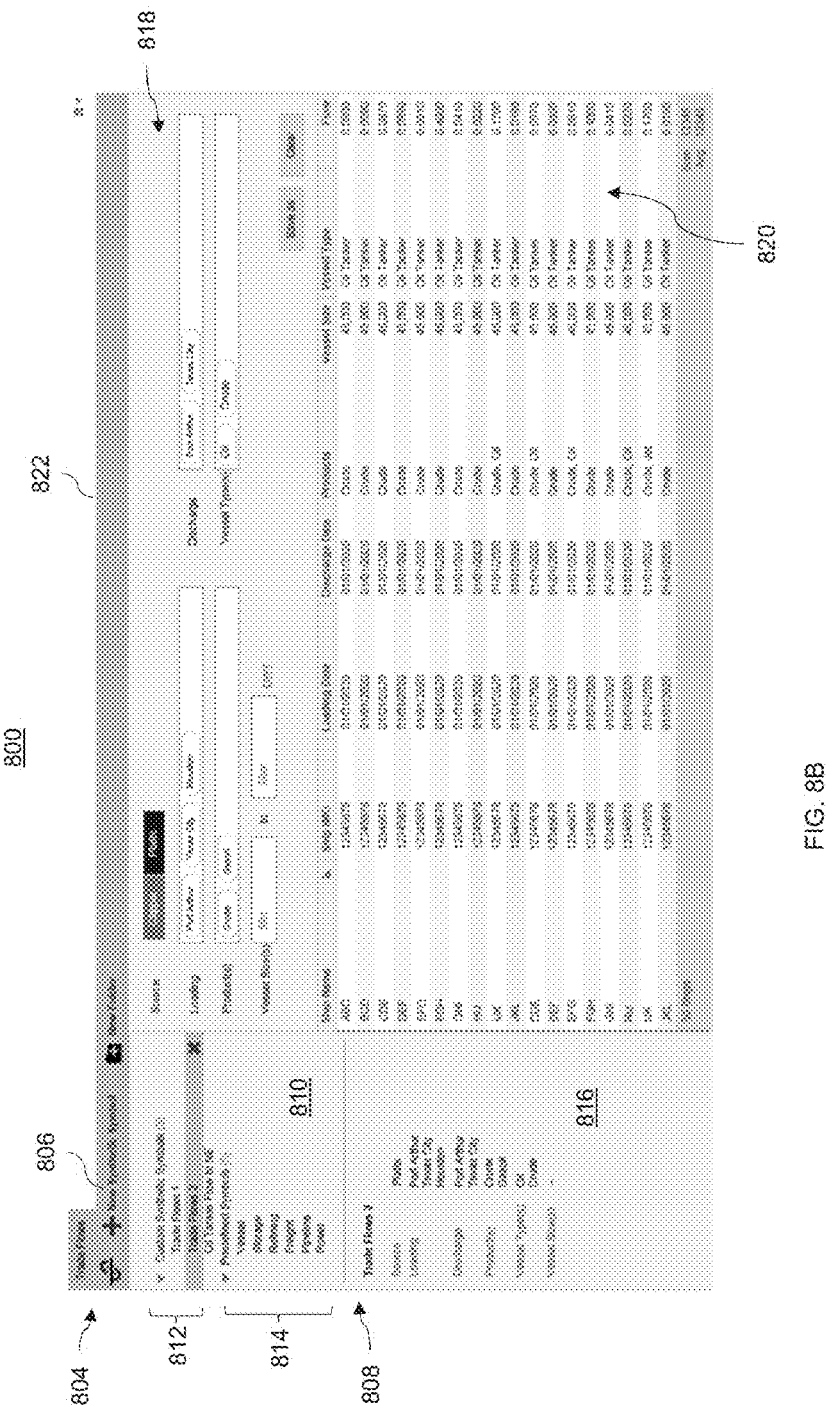

Referring to FIG. 8B, window 822 of interactive GUI 800 is shown, illustrating an example query. In window 822, user input fields of symbol query information region 816 include field value selections, and dynamic results region 820 include example data aggregation results for the query in query filter region 816. The results in dynamic results region 820 may be dynamically updated in real-time and/or near-real-time responsive to changes in the underlying data stored in database 124.

Figure 8C:
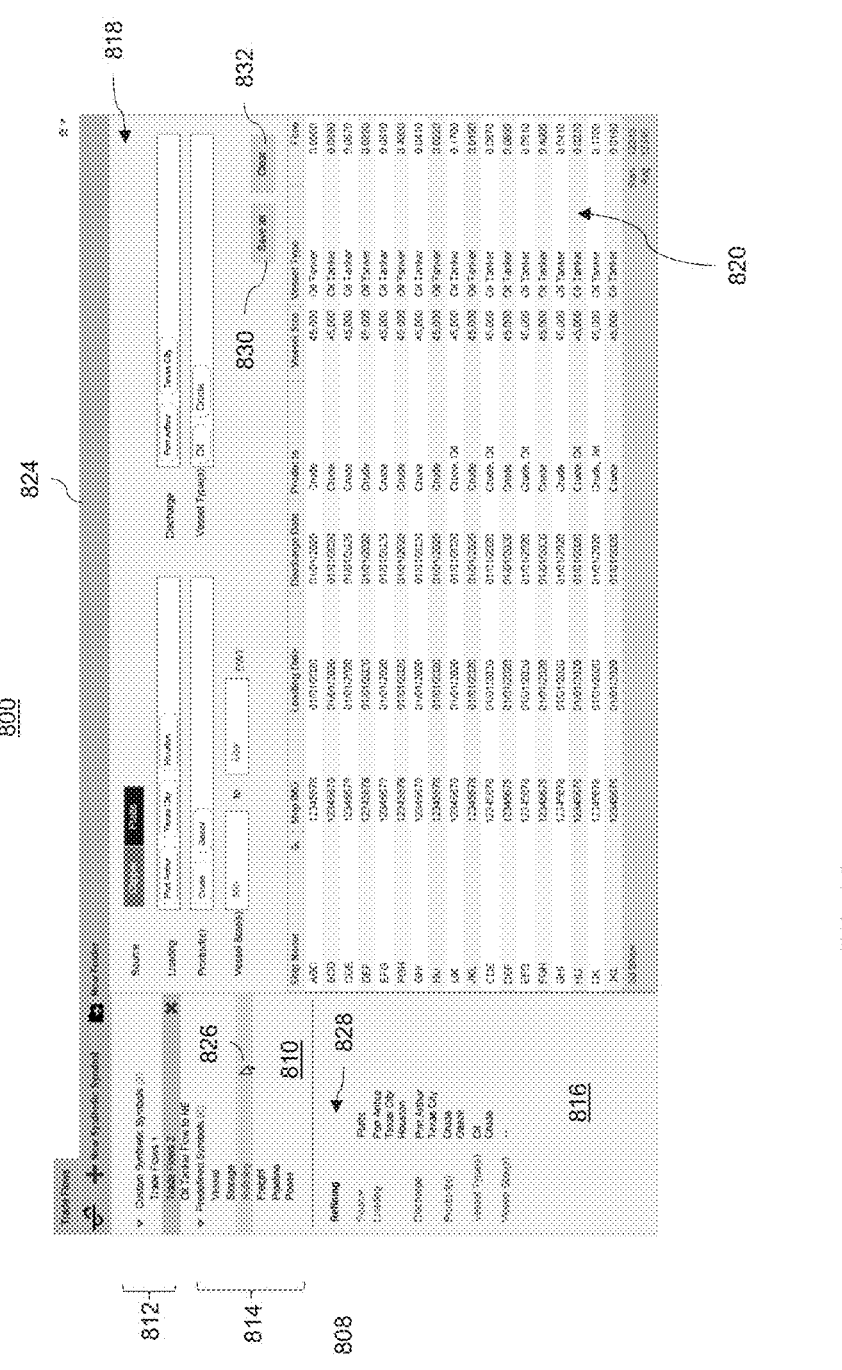

Referring to FIG. 8C, window 824 of interactive GUI 800 is shown. Window 824 illustrates an example of hovering action 826 over a particular predefined synthetic symbol ("Refining"). Hovering action 826 may cause symbol query information region 816 to provide query information 828 corresponding to the particular predefined symbol associated with hovering action 826. Window 824 also illustrates "Save as" button 830 and "Clear" button 832. User selection of "Save as" button 830 may prompt the user to create a name and save the currently open/new query as a new (custom) synthetic symbol, as shown in FIG. 8E. User selection of "Clear" button 832 may clear all inputs from query filter region 818.

Figure 8D:
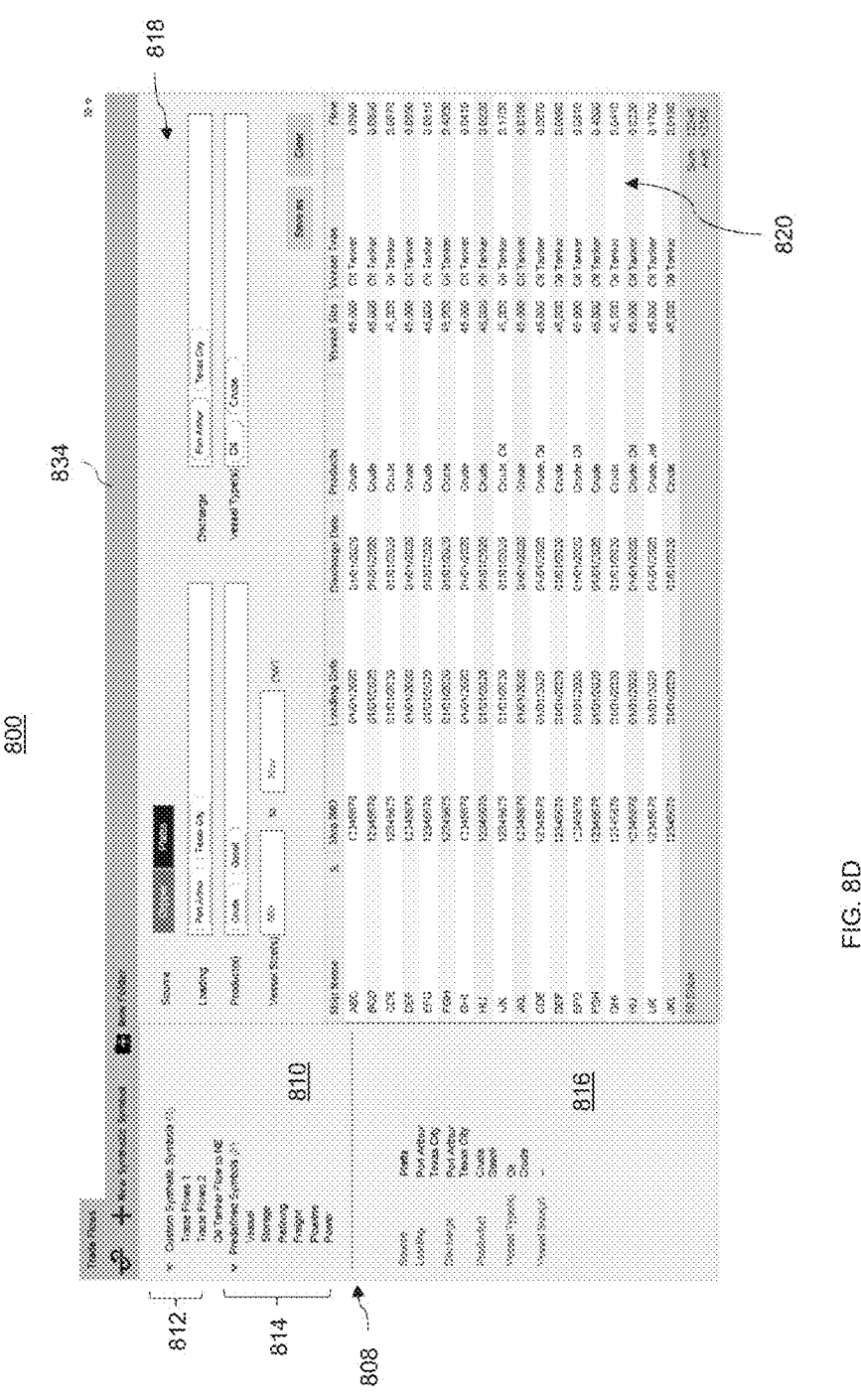
Figure 8E:
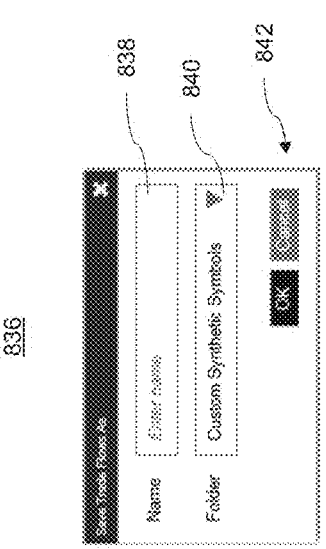

Referring to FIG. 8D, example window 834 of interactive GUI 800 is shown. Window 834 illustrates an example of updating an existing query. In FIG. 8D, the user input field value for "Loading" has been modified compared to FIG. 8C. In particular, the field value "Houston" has been removed in window 834. Responsive to the modification to "Loading", both symbol query information region 816 and dynamic results region 820 may be automatically updated, without any additional user input. In other words, no other user input is needed (e.g., no additional buttons need to be selected) to update any changes to a query in query filter region 818.

Referring to FIG. 8E, example pop-up window 836 of interactive GUI 800 is shown. Pop-up window 836 may be displayed when "Save" button 830 (FIG. 8C) is selected in query filter region 818. Pop-up window 836 may include text box 838 for user input of a custom symbol name (e.g., an alias) for saving the currently open and/or new query (e.g., the filter set) shown in query filter region 818. Pop-up window 836 may also include drop down selector 840 (or any suitable selector element) for assigning the custom synthetic symbol to be saved to a desired folder. Pop-up window 836 may also include one or more buttons 842 for saving the custom synthetic symbol or canceling the saving operation. Responsive to user input to save the custom synthetic symbol, server(s) of environment 100 may generate a subscription request that may include the alias indicated in text box 838 and the filter set indicated in query filter region 818 (including the fields and corresponding field values indicated in the user input fields), according to the pre-determined syntax and grammar rules described herein. For example, a subscription request for a symbol named "my symbol" may include an alias of "my symbol" and may have a filter set having filter parameters (selected in query filter region 818) with selected field values as shown in Table 2.

TABLE 2

| Example filter set of a subscription request. | |
| --- | --- |
| Filter Parameter | Field Value |
| Source | Platts Vessel Flow |
| Loading | Port Arthur |
| Discharge | Texas City |

TABLE 2-continued

Example filter set of a subscription request.

| Filter Parameter | Field Value |
|---|---|
| Products | Crude, Gas |
| Vessel Type | All |
| Vessel Size | >45000 |

Referring to FIG. 9A, a portion of example query filter region 818 of interactive GUI 800 is shown. In some examples, query filter region 818 may include user input field 902 for a "Loading" parameter, user input field 904 for a "Discharge" parameter, user input field 906 for a "Product(s)" parameter, user input field 908 for a "Vessel Type(s)" parameter and user input fields 910 for a "Vessel Size(s)" parameter.

Referring to FIG. 9B, loading input selection tool 912 (herein tool 912) is shown. Tool 912 may be shown when user input field 902 is selected. Tool 912 may include user input field 902 together with selection window 914. User input field 902 may include a text box for searching for a desired port, a region and/or a country for the "Loading" parameter. In some examples, selection window 914 may include a drop-down window. In some examples, selection window 914 may include toolbar 916 and one or more loading selection options 918. Loading selection options 918 may be arranged in an expandable/collapsible hierarchy of loading options. In some examples, each option may include favorites selection indicator 920. Favorites selection indicator 920 may be toggled to mark a loading selection option as a favorite (or unenabled to remove a loading selection option as a favorite). Tool 912 may allow for user selection of one or multiple loading options.

Toolbar 916 may include selectable search section options including "All", "Recent", "Favorites", "Ports", "Regions" and "Countries". The "All" search option may display loading options in selection window 914 from all search section options in a chronological searched order. The "Recent" search option may display recent search selections (e.g., search selections within a predetermined time period). The "Favorites" search option may display all favorite loading selection options (e.g., loading selection options 918 having favorites selection indicator 920 selected). The "Ports" search option may display all available ports. The "Regions" search option may display all available regions. The "Countries" search option may display all available countries.

Referring to FIG. 9C, an example of tool 912 is shown having the "Recent" search option selected in toolbar 916. In FIG. 9C, selection window 914 is updated to display a hierarchy of recent loading selection options 922. In some examples, recent loading selection options 922 may include recently used port, region and/or country search options. In some examples, one or more of loading selection options 922 may include additional drill down options (e.g., where available).

Referring to FIG. 9D, an example of tool 912 is shown in which loading selection option 924 is selected. In this example, when loading selection option 924 is selected in selection window 914, user input field 902 is also updated to indicate the same loading selection option. In some examples, hovering over a loading selection option in user input field 902 (e.g., "Port Arthur") may cause clear icon 926 to be displayed. Selection of clear icon 926 may cause the specific loading selection option indicated in clear icon 926 to be removed from user input field 902.

Referring to FIG. 9E, user input field 902 is shown having count indicator 928. In some examples, count indicator 928 may be displayed to indicate a number of additional loading selection options that have been selected when more loading selection options are shown in user input field 902 than can be displayed. Referring to FIG. 9F, in some examples, a size of user input field 902 may be expanded to display all selected loading selections options, when user input field 902 is selected.

User input field 904 for the "Discharge" parameter may include a similar text box, selection window and toolbar as described for the "Loading" parameter in FIGS. 9B-9F. Thus, user input field 904 may include a similar discharge input selection tool (e.g., similar to tool 912 with similar options) for selecting favorite discharge selection options and providing an expandable/collapsible hierarchy of discharge selection options. The discharge input selection tool may be shown when user input field 904 is selected.

Referring to FIG. 9G, product input selection tool 930 (herein tool 930) is shown. Tool 930 may be shown when user input field 906 is selected. Tool 930 may include user input field 906 together with selection window 932. In some examples, user input field 906 may include a text box for searching for one or more desired products for the "Product(s)" parameter. In some examples, selection window 932 may include a drop-down window that may display product selection options 934. In some examples, product selection options 934 may be arranged under "Clean" and "Dirty" categories. Tool 930 may allow for user selection of one or multiple product selection options 934, which selection(s) may be displayed in user input field 906. Similar to tool 912, any product selection options 934 in user input field 906 may be unselected at any time during a query.

Referring to FIG. 9H, vessel type input selection tool 936 (herein tool 936) is shown. Tool 936 may be shown when user input field 908 is selected. Tool 936 may include user input field 908 together with selection window 938. In some examples, user input field 908 may include a text box for searching for one or more desired vessel types for the "Vessel Type(s)" parameter. In some examples, selection window 938 may include a drop-down window that may display vessel type selection options 940. Tool 936 may allow for user selection of one or multiple vessel type selection options 940, which selection(s) may be displayed in user input field 908. Similar to tool 912, any of vessel type selection options 940 in user input field 908 may be unselected at any time during a query.

Referring to FIG. 9I, vessel size input selection tool 942 (herein tool 942) is shown. Tool 942 may be shown when one or more of user input fields 910 is selected. Tool 942 may include user input fields 910 together with selection window 944. In some examples, user input field 910 may include text boxes for selecting a range of vessel sizes (e.g., minimum and maximum values) for the "Vessel Sizes(s)" parameter. In some examples, selection window 944 may include a drop-down window that may display range selector 946 (e.g., an adjustable sliding scale) for selecting a vessel size range. Selection window 944 may also display one or more user input buttons 948 for specifying the vessel size with respect to barrels or deadweight tonnage (DWT). Similar to tool 912, a selected vessel size range in user input fields 910 may be unselected and/or modified at any time during a query.

In some examples, query filter region 818 may allow user input in one of user input field 908 (for the "Vessel Type(s)" parameter) and user input fields 910 (for the "Vessel Size(s)" parameter). For example, if user input field 908 is selected, user input fields 910 may be disabled (e.g., grayed out). Similarly, if one or more of user input fields 910 are selected, user input field 908 may be disabled (e.g., grayed out).

Referring back to FIG. 9A, in general, one or more of user input fields 902-910 may be configured to include any suitable interactive element including, without being limited to, ranges, list boxes, mini-search windows and/or radio buttons. In some examples, a list of selection options and fields may be dynamic and discoverable. Types of inputs to user input fields 902-910 may include, without being limited to, radio buttons, tree structures, toggles, dropdowns, text boxes, range selectors.

Referring to FIG. 10A, dynamic results region 820 of interactive GUI 800 is shown. Dynamic results region 820 may display aggregated data 1002 from database 124, based on a synthetic symbol selected in synthetic symbol selection region 808 and/or user input (including any modifications) to one or more of user input fields 902-910 of query filter region 818 (and data source selections in source selector 819). Because data in database 124 is continually monitored, the aggregated data 1002 displayed in dynamic results region 820 may be dynamically updated in real-time and/or near-real-time as the underlying data in database 124 changes.

Dynamic results region 820 may display aggregated data 1002 arranged in one or more columns and rows. In a non-limiting example, dynamic results region 820 may include columns for one or more of ship name, ship international maritime organization (IMO), loading date, loading port, discharge date, discharge port, products, vessel size, vessel type, volume and flow. In some examples, columns may be sorted in column headers. In some examples, a selected synthetic symbol may also be displayed in dynamic results region 820. In some examples, dynamic results region 820 may include one or more statistics (e.g., in a footer region of dynamic results region 820).

In some examples, dynamic results region 820 may include at least one sort indicator 1004 for sorting one or more of the columns. In some examples, one or more select columns may include inline user adjustable fields. In a non-limiting example, dynamic results region 820 may include flow menu selector 1006, calculation menu selector 1008 and ship total selector 1010. Selection of flow menu selector 1006 may display flow menu 1012 (FIG. 10B). Flow menu 1012 may provide flow sorting options for aggregated data 1002. Selection of calculation menu selector 1008 may display calculation menu 1014 (FIG. 10C). Calculation menu 1014 may provide options for flow statistics. In some examples, flow statistics may include one or more of a sum and an average trade flow. Selection of ship total selector 1010 may display ship total menu 1016 (FIG. 10D). Ship total menu 1016 may provide options for whether to display a total ship count.

Referring to FIG. 11A, synthetic symbol selection region 808 of interactive GUI 800 is shown. Synthetic symbol selection region 808 may be configured to display menu 1102 when a user right clicks on a custom synthetic symbol (e.g., "Trade Flows 2") in custom folder 812. In general, menu 1102 may include one or more selectable options associated with the selected custom synthetic symbol. In a non-limiting example, menu 1102 may include selections for "Generate", "Remove", "View", "add to Symbol List", "Move to Folder" and "New Folder." For example, selection of "Generate" may run a query for the selected synthetic symbol. A selection of "Remove" may remove the selected synthetic symbol from custom folder 812. A selection of "View" may open sub-menu 1104 and provide additional options for opening the selected synthetic symbol (i.e., the query filter set of the synthetic symbol) in a chart or a data table. A selection of "Add to Symbol List" may allow a user to add the selected synthetic symbol to one or more watchlists. A selection of "Move to Folder" may be used to move the selected synthetic symbol to another existing folder in synthetic symbol selection region 808. A selection of "New Folder" may be used to create and name a new folder in synthetic symbol selection region 808.

Referring to FIG. 11B, in some examples, a user may right click on a particular custom folder (e.g., custom folder 1106), illustrated by click operation 1108 (i.e., select a custom folder name rather than an individual synthetic symbol in the custom folder). The right click operation 1108 may cause menu 1110 to be displayed. Menu 1110 may provide options to create a new folder or delete the particular custom folder 1106.

Figure 12A:
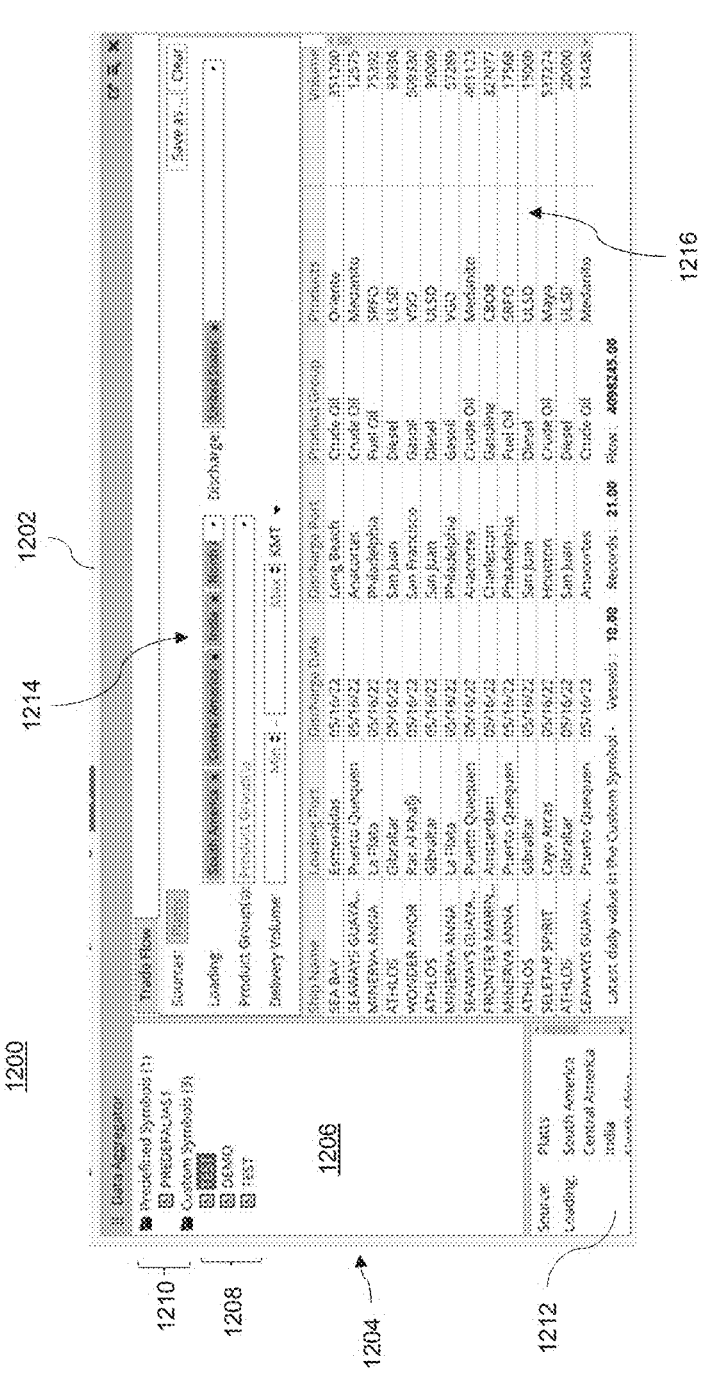
FIG. 12A is a screenshot of an example interactive GUI having a synthetic aggregation wizard providing interactive tools for viewing, editing and creating data aggregation queries associated with commodities data, according to another aspect of the present disclosure.
Figure 12B:
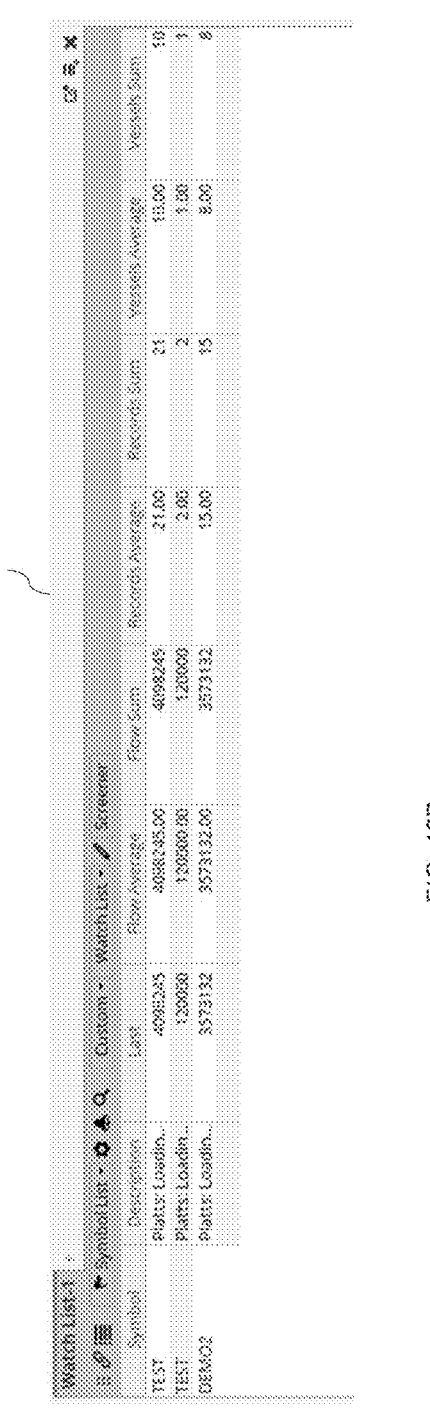
FIG. 12B is a screenshot of an example watchlist window that may utilize one or more synthetic symbols generated in the interactive GUI of FIG. 12A, according to an aspect of the present disclosure.
Figure 12C:
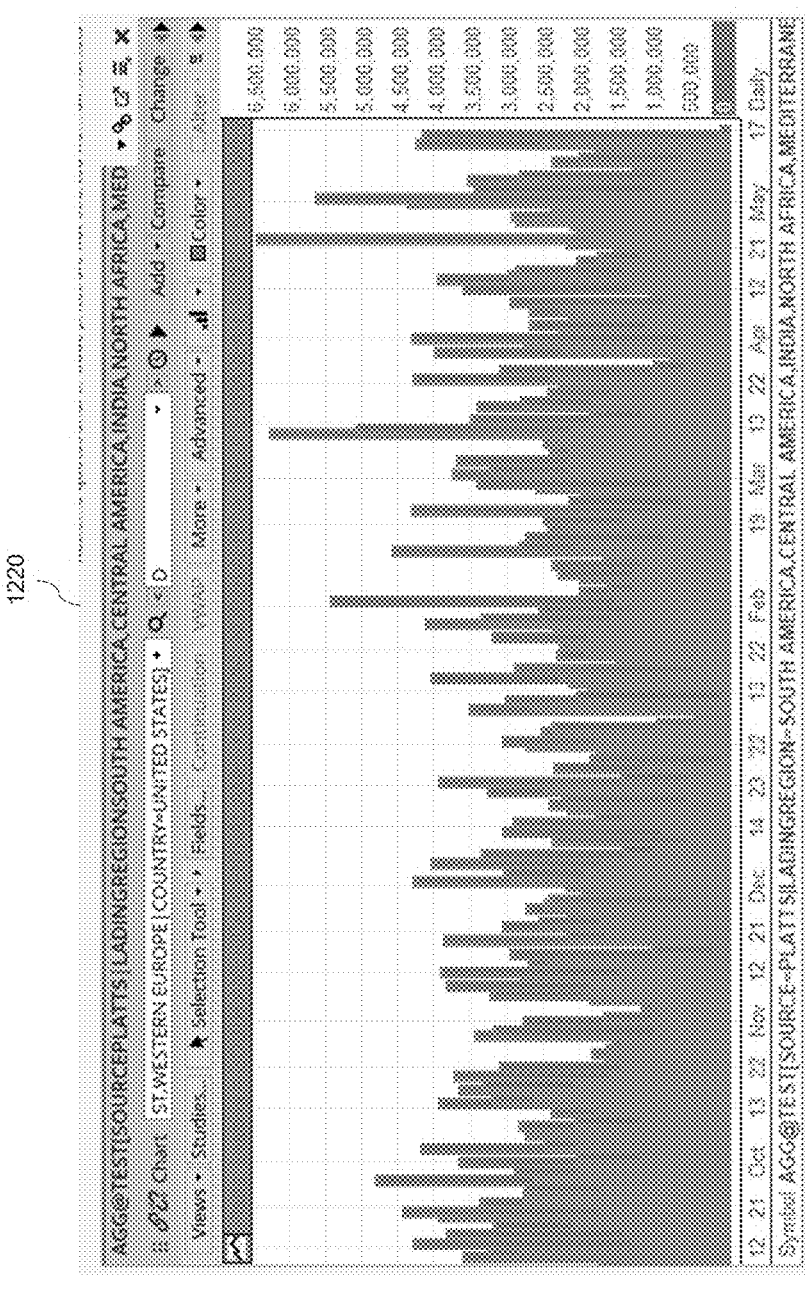
FIG. 12C is a screenshot of an example chart window that may utilize one or more synthetic symbols generated in the interactive GUI of FIG. 12A, according to an aspect of the present disclosure.
Figure 12D:
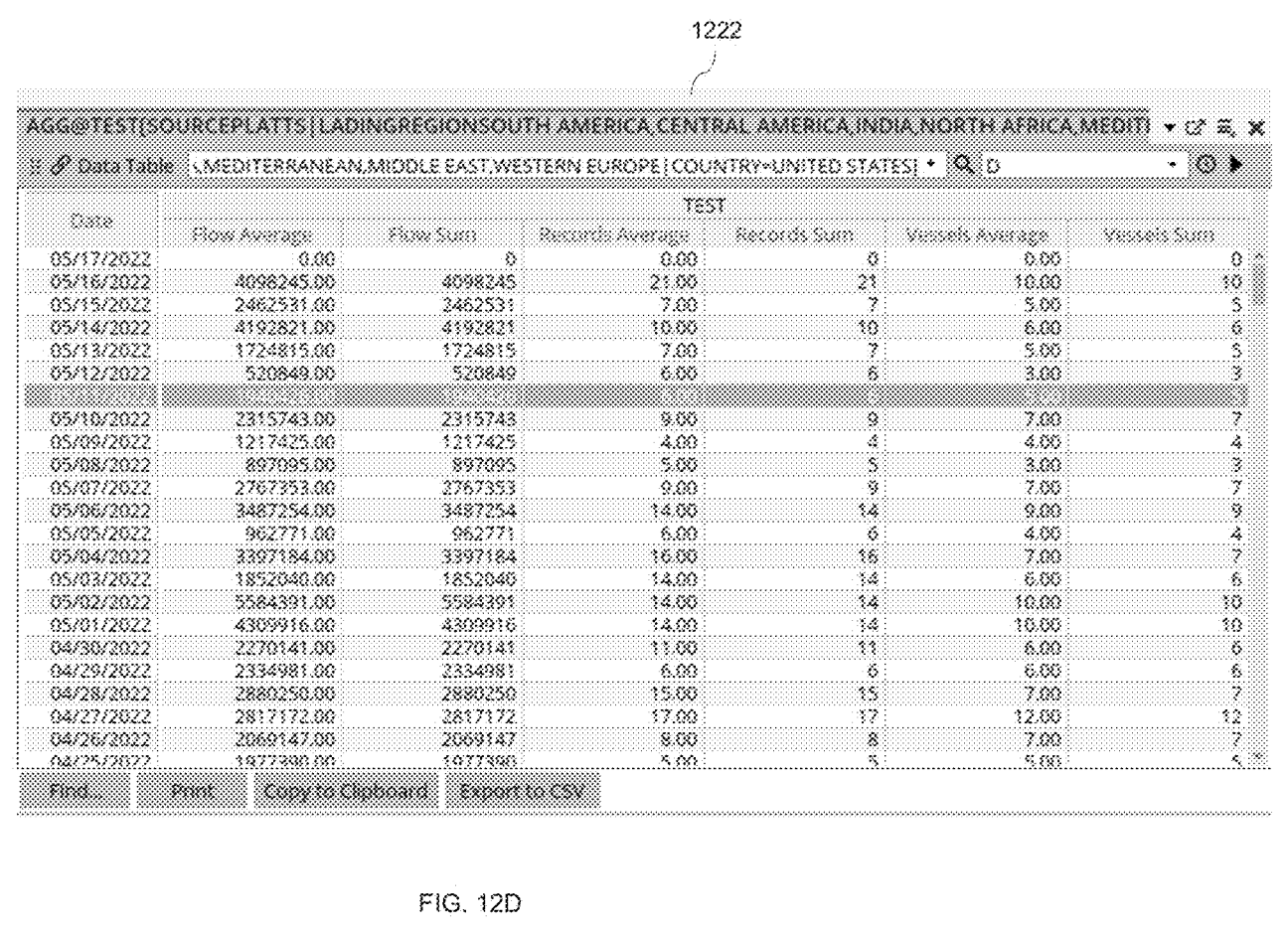
Figure 12E:
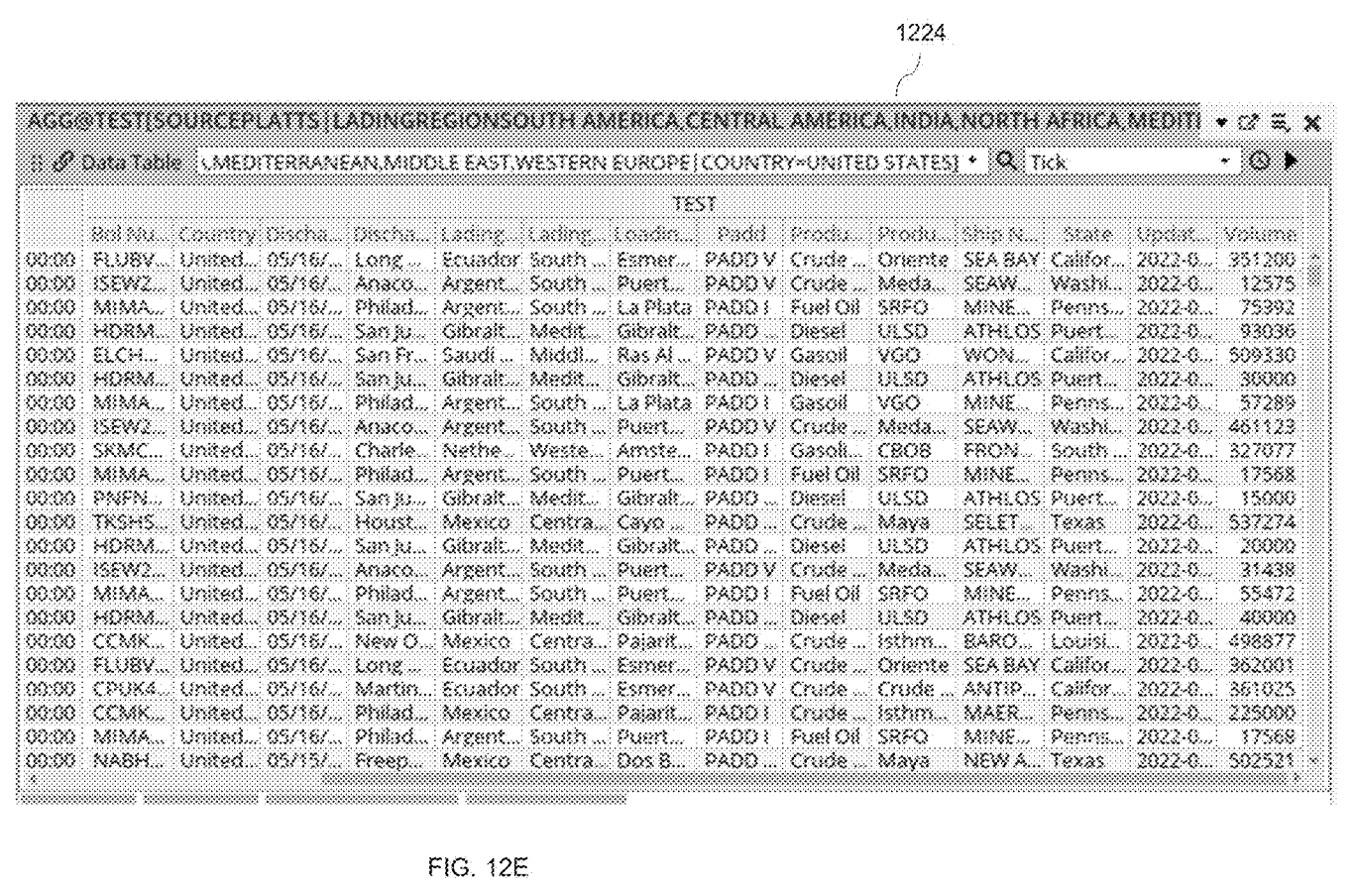

Next, examples of interactive GUI 1200 having synthetic aggregation wizard 142 are described with respect to FIGS. 12A-12E. Similar to interactive GUI 800, interactive GUI 1200 may provide interactive tools for viewing, editing and creating data aggregation queries associated with commodities data. In particular, FIG. 12A is a screenshot of example interactive GUI 1200; FIG. 12B is a screenshot of example watchlist window 1218 that may utilize one or more synthetic symbols generated in the interactive GUI 1200; FIG. 12C is a screenshot of example chart window 1220 that may utilize one or more synthetic symbols generated in interactive GUI 1200; and FIGS. 12D and 12E are screenshots of example respective data table windows 1222 and 1224 that may utilize one or more synthetic symbols generated in interactive GUI 1200. Interactive GUI 1200 is similar to interactive GUI 800 in that interactive GUI 1200 may include one or more windows, such as data aggregator window 1202 (referred to herein as window 1202), synthetic symbol selection region 1204, query filter region 1214 and dynamic results region 1216. Similar to synthetic symbol selection region 808, synthetic symbol selection region 1204 may include folder region 1206 having custom folder 1208 and predefined folder 1210, as well as symbol query information region 1212.

It should be understood that FIGS. 12A-12E represents a non-limiting example user interface, and that a differing interface configured in accordance with this disclosure may be provided for viewing, editing and creating data aggregation queries associated with commodities data. Although interactive GUI 1200 illustrates an example of commodities data that includes energy commodities (e.g., oil), interactive GUI 1200 is not limited to energy commodities data, and may be used with any suitable type of commodity (e.g., metal, livestock, meat and/or agricultural commodities), natural resource and/or any other desired type of data, as well as any desired combination of types of data.

Synthetic symbol selection region 1204 illustrates that custom synthetic symbols in custom folder 1208 may include any name selected by a user, include a same name (e.g., "TEST"). In interactive GUIs 800 and 1200, the user may define the filter set and may define a name for the query. In some examples, a name may be used more than once. In some examples, the same query can be named differently multiple times. Because the filter set of a query may be unique, the filter set may allows for disambiguation of the symbol name. In some examples, the name may include any suitable alphanumeric characters.

Window 1202 may allow users to create at least one custom synthetic symbol with an associated query, where the user may define the name and the filter set. The custom synthetic symbol(s) may persist in window 1202, and may include corrections and/or updates in real-time or near-real-time when applicable.

In some examples, a custom synthetic symbol may be used across other widgets including and not limited to, at least one watchlist (e.g., the watchlists shown in watchlist window 1218 of FIG. 12B), at least one chart (e.g., the chart shown in chart window 1220 of FIG. 12C) and/or at least one data table (e.g., the data tables shown in data table windows 1222 and 1224 of respective FIGS. 12D and 12E). In FIG. 12B, custom synthetic symbols in window 1202 named "TEST" (two different symbols) and "DEMO2" have watchlists in watchlist window 1218. In FIGS. 12C-12E, one of the custom synthetic symbols in window 1202 named "TEST" is shown with respect to a chart (in chart window 1220) and different data tables in data table windows 1222 and 1224. In some examples, custom synthetic symbols may be accessible in other client applications, such as (without being limited to) a spreadsheet application. In some examples, query and query names (e.g., custom synthetic symbols) between applications and windows may persist. In some examples, a custom synthetic symbol may be copied and pasted between client applications.

In some examples, a query from a watchlist (e.g., watchlist window 1218) may be dragged from the watchlist (or added via copy and paste) to query filter region 1214 so the query may be added inline. In some examples, a query may be dragged from window 1202 into a watchlist (e.g., watchlist window 1218). As shown in FIG. 12B, in some examples, watchlist window 1218 may include a name of each synthetic symbol in a symbol column. In some examples, a full description of a synthetic symbol may be displayed by hovering over the a specific row. Similar to dynamic results region 1216, watchlists in watchlist window 1218 may automatically display the most up-to-date (i.e., real-time and/or near-real-time) information as data in database 124 is updated.

In some examples, datasets, predefined synthetic symbols and query filter options that are presented to a user may depend on a user subscription, for example, content sets may be entitled individually. In some examples, users may be permitted to view data for which they are subscribed (e.g., entitled to). In some examples, queries may display results based on particular user entitlements. In some examples, custom synthetic symbol created by a first user (e.g., on a first user device 102) may be sent to a different (e.g., second) user. In some examples, the second user (if entitled) may also be configured to use the custom symbol in one or more client applications (including interactive GUIs 800/1200).

In some examples, custom syntenic symbols that are generated in interactive GUIs 800 and 1200 may function similar to a predefined synthetic symbol. An advantage of interactive GUIs 800 and 1200 include the ability to create on demand, custom queries. In some examples, a query may be maintained indefinitely (e.g., forever), and may exist in the workspace and or a spreadsheet so that they are transposable. In some examples, a query may be held on the client side until sent to the server side. The server(s) of environment 100 may hold active queries and update the client application on any active queries.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A method comprising:
generating, by one or more processors configured to execute computer-readable instructions stored in a memory, an interactive graphical user interface (GUI) comprising a query region and a data results region,
the query region configured to display one or more user input fields for generating one or more queries;
receiving, via at least one user device, user input associated with at least one field among the one or more user input fields of the query region to form a filter set;
creating a custom symbol associated with the filter set; and
automatically updating, responsive to the user input forming the filter set, the data results region to display one or more data values from among one or more databases associated with the filter set,
wherein the custom symbol is configured to be accessible in at least one of: a selectable symbol region associated with one or more predefined queries, one or more widgets associated with the interactive GUI and one or more client applications.

2. The method of claim 1, wherein the one or more widgets comprise one or more of at least one watchlist, at least one data table and at least one chart.

3. The method of claim 1, wherein the selectable symbol region is configured to display one or more predefined symbols associated with the one or more predefined queries.

4. The method of claim 3, wherein each of the one or more predefined symbols have a predefined filter set associated with a corresponding one of the one or more predefined queries.

5. The method of claim 3, further comprising:
updating the selectable symbol region to display the custom symbol among the one or more predefined symbols.

6. The method of claim 5, further comprising:
responsive to user input that drags a symbol among the custom symbol and the one or more predefined symbols of the selectable symbol region to a further portion of the interactive GUI, populating the further portion of the interactive GUI with information associated with the symbol, the further portion of the interactive GUI comprising one or more of the query region and at least one of the one or more widgets.

7. The method of claim 5, further comprising:
displaying, in the selectable symbol region, filter set information associated with a symbol among the custom symbol and the one or more predefined symbols responsive to user selection of said symbol.

8. The method of claim 3, further comprising, prior to receiving the user input associated with the at least one field:
populating, in the query region, existing filter set information in the one or more user input fields responsive to user selection of a symbol in the selectable symbol region, the symbol comprising one of the one or more predefined symbols.

9. The method of claim 1, further comprising:
receiving, via the query region, from the at least one user device, a subscription request to save the filter set as a user-customized query, the custom symbol being created and associated with the filter set responsive to the subscription request.

10. The method of claim 9, wherein the subscription request includes a custom name generated via further user input, the method further comprising:

indicating the custom name of the custom symbol in the selectable symbol region.

11. The method of claim 1, further comprising:

displaying, in the query region, at least one selection element for user selection of one or more data sources.

12. The method of claim 11, further comprising:

displaying, in one or more of the selectable symbol region and the query region, one or more interactive elements for user interaction based on a user subscription of a user of the at least one user device.

13. The method of claim 1, wherein, prior to receiving the user input associated with the at least one field, each of the one or more user input fields are configured to be unpopulated.

14. The method of claim 1, further comprising:

generating, via the at least one field, a selection window responsive to the user input, the selection window including at least one of a range selection element and a list of predetermined selection options associated with the at least one field.

15. The method of claim 14, further comprising:

displaying the list of predetermined selection options in an expandable and collapsible hierarchy.

16. The method of claim 14, wherein the selection window is configured to include a toolbar for searching the list of predetermined selection options according to one or more predetermined categories.

17. The method of claim 1, further comprising:

storing data from one or more data sources in the one or more databases.

18. The method of claim 17, wherein the data results region is configured to display results associated with one or more of the query region and the selectable symbol region.

19. The method of claim 18, further comprising:

automatically updating the data results region responsive to changes in the one or more data values in the one or more databases.

20. The method of claim 18, further comprising:

automatically updating the data results region responsive to the user input forming the filter set without any further user input.

21. The method of claim 18, wherein the data stored in the one or more databases comprises one or more of commodities data, natural resource data and market data.

22. The method of claim 21, wherein the one or more user input fields are associated with one or more of loading information, discharging information, vessel size information, vessel type information, product information, draught information and country information.

23. The method of claim 21, wherein the one or more data values from the one or more databases associated with the filter set are displayed in the data results region and are associated with one or more of flow information, volume information, vessel count, ship capacity, freight charge, ship information, loading date, loading port, discharge date, discharge port, product information, vessel size and vessel type.

* * * * *